United States Patent
Mukunashi

(10) Patent No.: US 8,077,220 B2
(45) Date of Patent: Dec. 13, 2011

(54) IMAGE DISPLAY APPARATUS

(75) Inventor: Masayuki Mukunashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 11/462,941

(22) Filed: Aug. 7, 2006

(65) Prior Publication Data

US 2007/0146493 A1 Jun. 28, 2007

(30) Foreign Application Priority Data

Aug. 12, 2005 (JP) ................ 2005-235091

(51) Int. Cl.
H04N 5/76 (2006.01)
(52) U.S. Cl. .................................. 348/231.2
(58) Field of Classification Search ............ 348/333.01, 348/333.02, 333.03, 333.04, 333.05, 231.2
See application file for complete search history.

(56) References Cited

U.S. PATENT DOCUMENTS

| | | | |
|---|---|---|---|
| 5,806,072 A * | 9/1998 | Kuba et al. | 707/200 |
| 6,538,698 B1 * | 3/2003 | Anderson | 348/333.05 |
| 7,193,646 B1 * | 3/2007 | Shioji | 348/220.1 |
| 2004/0085457 A1 | 5/2004 | Thorland | |
| 2005/0052550 A1 | 3/2005 | Sato | |
| 2006/0044622 A1 * | 3/2006 | Yasuda | 358/448 |

FOREIGN PATENT DOCUMENTS

| | | |
|---|---|---|
| JP | 2000-078517 A | 3/2000 |
| JP | 2001-169222 | 6/2001 |
| JP | 2003-085069 A | 3/2003 |
| JP | 2004-153426 | 5/2004 |
| JP | 2004-153832 | 5/2004 |
| JP | 2005-078039 | 3/2005 |
| JP | 2005-078045 | 3/2005 |
| JP | 2005-078610 | 3/2005 |
| JP | 2005-086761 | 3/2005 |
| JP | 2005-295261 | 10/2005 |

OTHER PUBLICATIONS

Terry Ogletree, Microsoft Windows XP Unleashed, Copyright @ 2002 by Sams Publishing, Chapter 14, pp. 278-279.*

* cited by examiner

*Primary Examiner* — David Ometz
*Assistant Examiner* — Akshay Trehan

(57) ABSTRACT

An image display apparatus includes an image readout unit which reads an image from a recording medium, a display unit which displays the image, a user interface unit which turns on an jump mode, and a control unit which changes an image displayed on the display unit. If the jump mode is on, the control unit can change an image displayed on the display unit to an image existing in a folder N folders ahead or behind of a currently selected folder, wherein N is an integer equal to or greater than 1.

9 Claims, 19 Drawing Sheets

IMAGE DISPLAY APPARATUS

BACKGROUND OF THE INVENTION

1. Field of the Invention

The present invention relates to an apparatus for displaying an image stored in a recording medium.

2. Description of the Related Art

In recent years, digital cameras that can electronically process information of images taken and store the information of images as image files in a recording medium such as a memory card are becoming widely used. Moreover, most of such digital cameras are configured to display images on a built-in display apparatus (for example, a liquid crystal display panel) or an external display apparatus (for example, a television set) connected to a video output thereof.

A user finds a desired image file to be viewed by shifting recorded images forward or backward by one frame per operation and checking each image. Some digital cameras have a jump function that can display an image N (N is an integer equal to or greater than 2) frames ahead or behind, instead of one frame, per operation. Using such a jump function, if the user recognizes that a desired image file does not exist near the image currently displayed, the desired image file can be found and viewed with a lesser times of operation.

In recent years, on the other hand, a trend is accelerating toward a higher capacity of the recording medium. As this trend continues, the number of frames of images (number of image files) recorded on one recording medium becomes larger. With such a large number of image files that can be recorded, the user must repeat an operation of shifting the frame forward or backward to find and view a desired image file, thus being forced into troublesome operations.

A digital camera having the above-described jump function is discussed in Japanese Patent Application Laid-Open No. 2004-153832. Japanese Patent Application Laid-Open No. 2004-153832 discusses an image reproduction method in which the reproduction operation jumps to the first image or an initial screen when the user operates an up button and jumps to the last image or the initial screen when the user operates a down button.

Also, some types of digital cameras allow the user to photograph by specifying a folder in which image files are recorded depending on purposes. In such cameras, when reproducing images for each purpose, the user must reproduce images while recognizing folders. In conventional digital cameras, a display screen must be switched from a reproduction screen on which images are displayed for reproduction to a folder selection screen, and after a folder is selected, the display screen must be brought back to the reproduction screen.

However, there is a problem that conventional digital cameras equipped with the jump function have a jump frame number N that is too large or small with respect to a total number of frames of recorded images. Also, since a jump destination image or a previous image may be in another folder, it is not easy to know which folder image will be reproduced next. Thus, the conventional digital cameras equipped with the jump function are inconvenient for users to find an image while recognizing a desired folder.

Also, in the case of jumping only to the first or last image using the jump function like, for example, the one in the digital camera discussed in Japanese Patent Application Laid-Open No. 2004-153832, when the number of frames of recorded images has increased, operations will become complicated and troublesome in the end because frames must be more frequently shifted for viewing.

Digital cameras that allow the user to select a folder by switching the display screen to the folder selection screen force the user to select the folder without recognizing all images in the folder. In such a case, because the user can check whether a folder is the desired folder only after displaying some images in the selected folder, operations will become complicated and troublesome.

SUMMARY OF THE INVENTION

One aspect of the present invention is to overcome the above-described drawbacks and disadvantages. For example, an aspect of the present invention is directed to enabling searching for a desired folder or image from a recording medium by simple and user friendly operations.

According to an aspect of the present invention, an image display apparatus is provided which includes an image readout unit configured to read an image from a recording medium; a display unit configured to display the image; a user interface unit configured to turn on a jump mode; and a control unit configured to change an image displayed on the display unit, wherein if the jump mode is on, the control unit can change an image displayed on the display unit to an image existing in a folder N folders ahead or behind of a currently selected folder, wherein N is an integer equal to or greater than 1.

Moreover, according to yet another aspect of the present invention, a method is provided for controlling an image display apparatus, the apparatus including an image readout unit configured to read an image from a recording medium; a display unit; a user interface unit configured to turn on a jump mode; and a control unit configured to control the apparatus. The method includes reading an image from the recording medium; displaying the image on the display unit; and changing an image displayed on the display unit to an image existing in a folder N folders ahead or behind of a currently selected folder, wherein N is an integer equal to or greater than 1, if the jump mode is on.

Additionally, according to still yet another aspect of the present invention, a computer readable medium is provided which contains computer-executable instructions for controlling an image display apparatus. The apparatus includes an image readout unit configured to read an image from a recording medium; a display unit; a user interface unit configured to turn on a jump mode; and a control unit configured to control the apparatus. The computer readable medium includes computer-executable instructions for reading an image from the recording medium; computer-executable instructions for displaying the image on the display unit; and computer-executable instructions for changing an image displayed on the display unit to an image existing in a folder N folders ahead or behind of a currently selected folder, wherein N is an integer equal to or greater than 1, if the jump mode is on.

According to another aspect of the present invention, an image display apparatus is provided which includes an image readout unit configured to read an image from a recording medium; a display unit configured to display the image; a user interface unit configured to turn on a jump mode; a setting unit configured to set an integer N according to the number of folders in the recording medium, the integer N is equal to or greater than 1; and a control unit configured to change an image displayed on the display unit, wherein if the jump mode is on, the control unit can change an image displayed on the display unit to an image existing in a folder N folders ahead or behind of a currently selected folder.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

DETAILED DESCRIPTION OF THE EMBODIMENTS

Exemplary embodiments, features and aspects of the present invention will now be herein be described in detail below with reference to the drawings.

First Exemplary Embodiment

Exemplary Image Reproduction Apparatus

Figure 1:
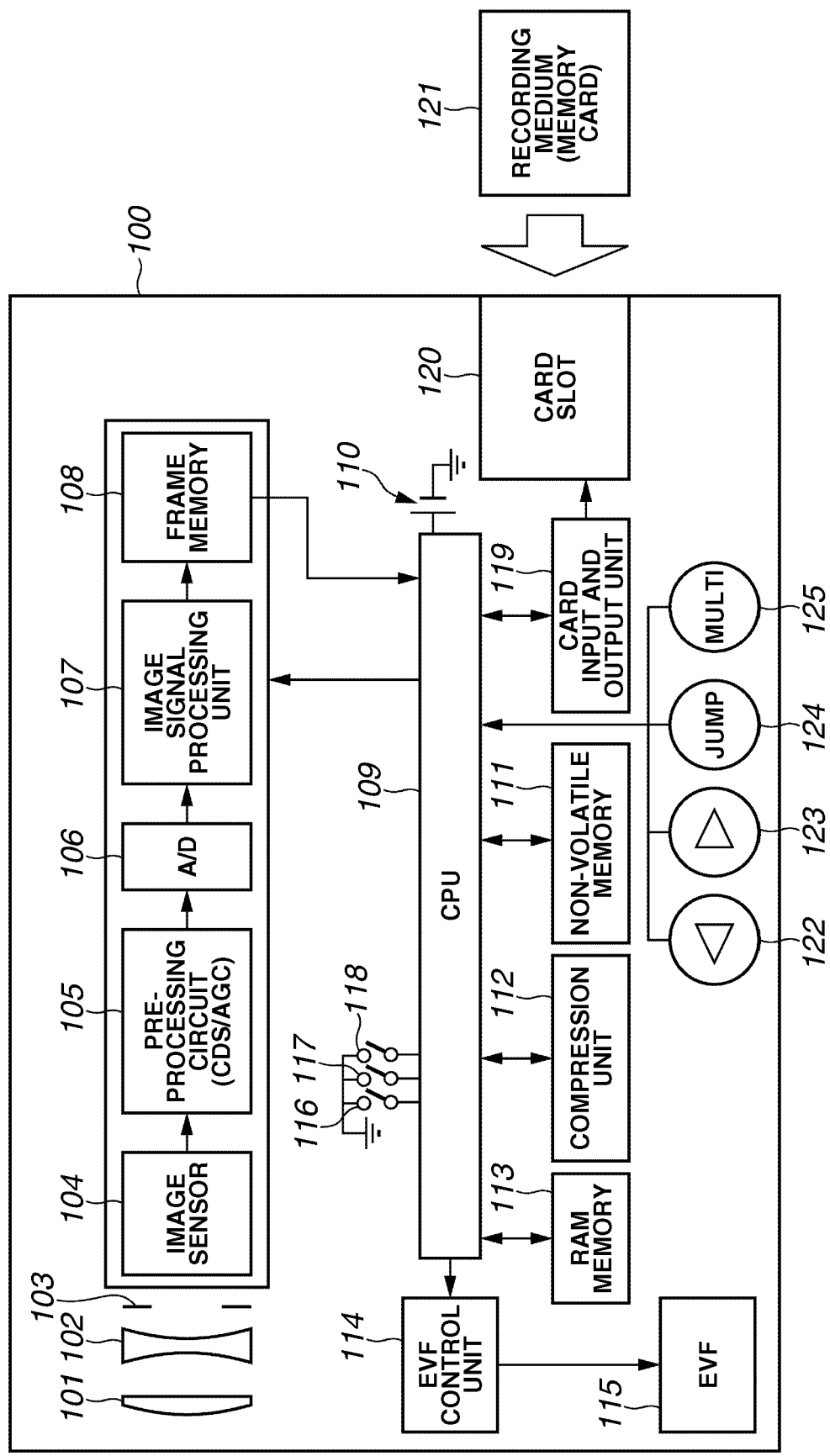
FIG. 1 is a block diagram showing an example of configuration of a digital camera according to a first exemplary embodiment of the present invention.

FIG. 1 is a block diagram showing a configuration example of a digital camera, which is an example of an image reproduction apparatus according to a first exemplary embodiment of the present invention. It is noted that the image reproduction apparatus according to the present embodiment is not intended to be limited to a digital camera, rather, it may also be a digital video camera, a cellular phone with a camera, or the like.

In FIG. 1, a digital camera 100 picks up an image of an object. A power unit 110 supplies power to each circuit (each functional unit) inside the digital camera 100. A card slot 120 is a slot to/from which a memory card 121, which is an example of a removable recording medium, can be inserted/removed. The memory card 121 is a card-shaped recording medium containing non-volatile memory. The memory card 121 can be, for example, an SD memory card or Compact-Flash (registered trademark). While the memory card 121 remains inserted to the card slot 120, the memory card 121 is electrically connected with a card input and output unit 119, allowing transmission and reception of data such as commands and image files to or from the digital camera 100.

In the present embodiment, it is noted that the memory card 121 is used merely as an example of a removable recording medium, but is not limited thereto. For example, instead of the memory card, a hard disk drive, optical disk, magneto-optical disk, magnetic disk and the like may be used.

A focusing lens 101 performs focusing by moving along an optical axis, and similarly, a zooming lens 102 performs zooming of a pickup image by moving along the optical axis. A diaphragm 103 regulates an amount of light entering an image sensor 104. Thus, the focusing lens 101, the zooming lens 102, and the diaphragm 103 constitute components of the imaging optical system of the digital camera 100.

The image sensor 104 is a photoelectric conversion element constituted of a CCD image sensor, CMOS image sensor or the like. The image sensor 104 performs photoelectric conversion of an optical image of an object formed by the imaging optical system constituted of the optical elements 101 to 103 and outputs an image signal. A pre-processing circuit 105 has a CDS (correlated double sampling) circuit, AGC (automatic gain control) circuit and the like, and removes noise of the image signal output from the image sensor 104 while controlling a gain.

An A/D (analog-digital) converter 106 converts an analog image signal output by the pre-processing circuit 105 into a digital image signal. An image signal processing unit 107 generates image data by performing image processing such as a gamma correction or AWB (automatic white balance) on the digital image signal obtained by conversion processing performed by the A/D converter 106. The image signal processing unit 107 corrects non-linearity of image density attributable to characteristics of the image sensor 104 and bias of image color attributable to a light source. Frame memory 108 is a memory that functions as so-called buffer memory and temporarily stores image data generated by the image signal processing unit 107.

The image sensor 104, the pre-processing circuit 105, the A/D converter 106, the image signal processing unit 107, and the frame memory 108 constitute a photoelectric conversion system that converts an object image generated by the imaging optical system into image data.

The power unit 110, a non-volatile memory 111, a compression unit 112, a RAM memory 113, an EVF/LCD control unit 114, an EVF/LCD 115, a main switch 116, a first release switch 117, a second release switch 118, the card input and output unit 119, and operation buttons 122-125 are connected to a CPU (Central Processing Unit) 109 that controls the whole digital camera 100. The EVF/LCD 115 has two display units, and one is an EVF (electronic view finder) and the other is an LCD (liquid crystal display) The EVF has a smaller liquid crystal display than the LCD.

The CPU 109 controls operation timings of functional units such as the image sensor 104, the pre-processing circuit 105, the A/D converter 106, the image signal processing unit 107, and the frame memory 108 by sending out a clock signal to control reading of the image signal from the image sensor 104. The CPU 109 controls functional units of the digital camera 100 by reading and executing software (computer programs) stored in the non-volatile memory 111. For example, by reading and executing a processing program from the non-volatile memory 111, the CPU 109 realizes the image shifting operation in folder jump shift mode shown in FIG. 2 described later.

The non-volatile memory 111 is constructed of, for example, EEPROM and stores processing programs to be executed by the CPU 109 and various kinds of data. The non-volatile memory 111 retains stored programs and data without losing them even when the power unit 110 is turned off and power supply is cut off.

The compression unit 112 reduces the amount of data, more specifically, an image file size, by performing predetermined image compression processing (for example, image compression processing in JPEG format) on input image data. The RAM memory 113 functions as so-called work memory of the CPU 109 and temporarily stores data when the CPU 109 performs various processing. The EVF/LCD control unit 114 controls the EVF/LCD 115. The EVF/LCD control unit 114 also supplies the same image to the EVF and LCD.

When the main switch 116 is turned on by user's operation, the CPU 109 executes a predetermined program for photographing. The first release switch 117 is turned on by a first stroke (half pressed) of a release button and the second release switch 118 is turned on by a second stroke (fully pressed) of the release button. For example, in the digital camera 100 according to the present embodiment, when the first release switch 117 is turned on, pre-processing related to photographing operations such as distance measurement and exposure detection is performed, and when the second release switch 118 is turned on, imaging processing of actually obtaining an object image is performed. The release button is a button (not shown) provided in the digital camera 100 so as to enable the user to operate it.

When one of the manual operation buttons 122-125 is pressed, the CPU 109 executes an operation corresponding to the pressed button or enables a function corresponding to the button. More specifically, when one of the image shift backward button 122, image shift forward button 123, and multi-display button 125 is pressed, the CPU 109 executes an operation related to image backward shifting, image forward shifting, or multi-display corresponding to the pressed button. Here, the multi-display is, for example, an operation to display a plurality of images simultaneously in the EVF/LCD 115. When a jump button 124 is pressed, the CPU 109 sets an operating state of the digital camera 100 to the folder jump shift mode and enables a function related to folder jumping.

If the jump button 124 is turned on when the jump button 124 is pressed, the folder jump shift mode is also turned on. In such a case, the CPU 109 performs a control operation to display, on the EVF/LCD 115, an icon, graphic, character, or symbol indicating that the folder jump shift mode is on. If, on the other hand, the jump button 124 is turned off when the jump button 124 is pressed, the folder jump shift mode is also turned off. In such a case, the CPU 109 performs a control operation to display, on the EVF/LCD 115, an icon, graphic, character, or symbol indicating that the folder jump shift mode is off. At this point, instead of performing the control operation to display, on the EVF/LCD 115, an icon, graphic, character, or symbol indicating that the folder jump shift mode is off, the CPU 109 may perform a control operation not to display, on the EVF/LCD 115, an icon, graphic, character, or symbol indicating that the folder jump shift mode is on.

The card input and output unit 119 is an interface unit configured to perform transmission/reception of data such as commands and image files with the memory card 121. The card input and output unit 119 can not only send commands to the memory card 121 inserted to the card slot 120, but also send and receive various kinds of data to and from the memory card 121.

The memory card 121 has a function to record or store compressed image data and includes semiconductor memory such as flash memory, magnetic disk, or optical disk. When recording compressed image data on the memory card 121, compressed image data related to one captured image is recorded as one image file. Each image file is classified into either a user-selected folder or a folder selected or generated automatically by the digital camera 100 and then recorded in the folder.

[Exemplary Operation of the Image Reproduction Apparatus]

Next, exemplary operations of the image reproduction apparatus will be described. Since an imaging operation of the digital camera 100 according to the present embodiment and a recording operation of image data obtained from the imaging operation in a recording medium are similar to those of a conventional digital camera, descriptions thereof are not provided here.

However, in the present embodiment, as described above, image data related to one captured image is recorded as one image file. Each image file is classified into either a user-selected folder or a folder selected or generated automatically by the digital camera 100 and then recorded in the folder. Also in the present embodiment, an arrangement order for displaying image files recorded on the memory card 121, which is an example of the recording medium, that is, a display order of images during normal image reproduction, is assumed to be the order of photographing. The order of displaying images is not limited to that of photographing and the order of file names can also be adopted.

Basic operations in the present embodiment when the user performs an operation on one of the manual operation buttons 122-125 will be described. If the image shift backward button 122 is pressed during the normal image reproduction, the digital camera 100 according to the present embodiment displays a previous image to the image currently displayed on the EVF/LCD 115, and if the image shift forward button 123 is pressed, the digital camera 100 displays a next image to the image currently displayed on the EVF/LCD 115.

If the image shift forward button 123 is pressed while displaying a latest image, the digital camera 100 displays an oldest image on the EVF/LCD 115. Conversely, if the image shift backward button 122 is pressed while displaying the oldest image, the digital camera 100 displays the latest image on the EVF/LCD 115. If the jump button 124 is pressed by the user during the normal image reproduction, the operating state of the digital camera 100 enters the folder jump shift mode and a folder jump function is enabled.

Figure 2:
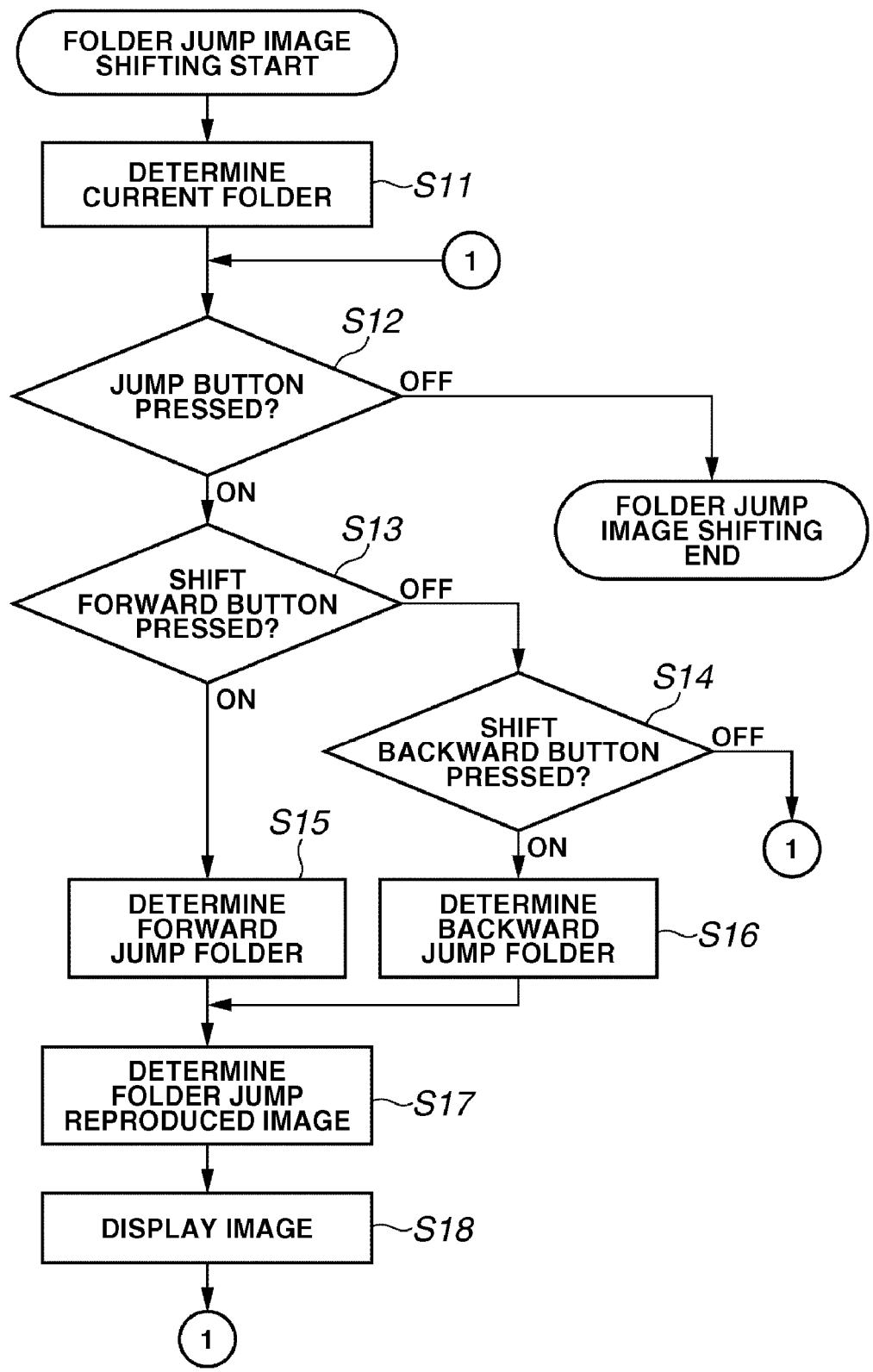
FIG. 2 is a flow chart showing an exemplary image shifting operation when a folder jump shift mode is on, according to an aspect of the present invention.

FIG. 2 is a flow chart showing an example of the image shifting operation of the digital camera 100 according to the present embodiment. The image shifting operation when the folder jump shift mode is turned on will be described with reference to the flow chart shown in FIG. 2.

If the jump button 124 is pressed by the user during the normal image reproduction and the operating state enters the folder jump shift mode, the CPU 109 determines a folder in which the image currently displayed exists as a "current folder" (S11). An image file corresponding to the image currently displayed is determined as a "current file." Here, if the multi-display which displays a plurality of images simultaneously is used, the CPU 109 determines an image file corresponding to an image selected from the plurality of images being displayed as the "current file" and determines a folder in which the current file exists as the current folder. The current folder may be determined by any method. For example, the CPU 109 may determine an image which has been selected in a normal image reproduction processing as the current file. Alternatively, the CPU 109 may determine a folder in which more multi-displayed images exist than any other folder as the current folder.

After determining the current folder in step S11, the CPU 109 determines whether the jump button 124 is on or off (S12). If, as a result, the jump button 124 is determined to be off, the CPU 109 performs a control operation to return to normal reproduction and terminates folder jump image shifting processing.

If, on the other hand, the jump button 124 is determined to be on as a result of determination in step S12, the CPU 109 determines whether the image shift forward button 123 is on or off (S13). If, as a result, the image shift forward button 123 is determined to be on, the CPU 109 performs forward jump folder determination processing (S15).

If, on the other hand, the image shift forward button 123 is determined to be off as a result of the determination in step S13, the CPU 109 determines whether the image shift backward button 122 is on or off (S14). If, as a result, the image shift backward button 122 is determined to be on, the CPU 109 performs backward jump folder determination processing (S16).

If, on the other hand, the image shift backward button 122 is determined to be off as a result of the determination in S14, that is, if the jump button 124 is on and both the image shift buttons 122 and 123 are off, the CPU 109 returns to step S12 and determines again whether the jump button 124 is on or off.

In the forward jump folder determination processing in step S15, the CPU 109 determines a next folder in order of folder with respect to the folder in which the image currently displayed exists as a "jump folder." Similarly, in the backward jump folder determination processing in step S16, the CPU 109 determines a previous folder in order of folder with respect to the folder in which the image currently displayed exists as a "jump folder." Details of the forward jump folder determination processing in step S15 and the backward jump folder determination processing in step S16 will be described later. Folders in the memory card 121 may be ordered in any way. For example, a creation date/time or folder name may be considered. In the present embodiment, an example in which each folder is arranged by folder name will be described.

After determining the jump folder in the jump folder determination processing in step S15 or S16, the CPU 109 performs folder jump reproduced image determination processing (S17). In the folder jump reproduced image determination processing in step S17, the CPU 109 determines one or more images in the determined jump folder including a top image as reproduced images. Then, the CPU 109 displays the reproduced image determined in step S17 on the EVF/LCD 115 (S18) and returns to step S12.

After the jump button 124 is pressed and turned on, the processing of steps S12 to S18 described above is performed by the CPU 109 until it is determined that the jump button 124 is turned off.

Figure 3:
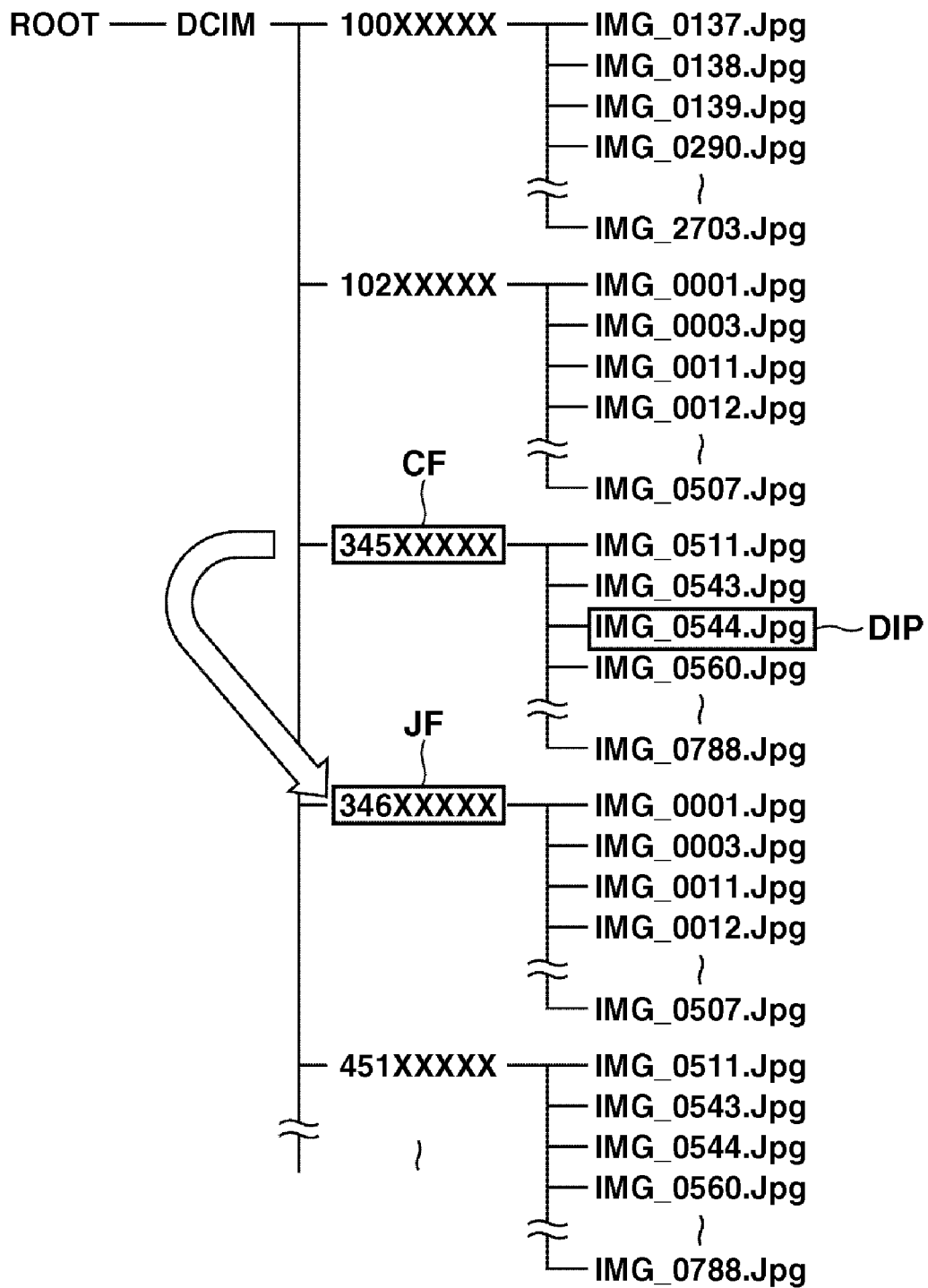
FIG. 3 is a diagram illustrating an example of forward jump folder determination processing, according to an aspect of the present invention.

Next, the jump folder determination processing performed in step S15 and S16 shown FIG. 2 will be described. FIG. 3 is a diagram illustrating the forward jump folder determination processing in step S15 shown in FIG. 2. A plurality of folders in the memory card 121 is, for example, configured as a hierarchical structure shown in FIG. 3. Many image files are recorded, as shown FIG. 3, in each folder under a DCIM folder. Then, it is assumed that an image related to an image file DIP ("IMG_0544.Jpg") is displayed in normal image reproduction processing.

If, at this point, the jump button 124 is pressed by the user and turned on, the CPU 109 determines the image file DIP ("IMG_0544.Jpg") as a current file and a folder "345XXXXX" in which the image file DIP ("IMG_0544.Jpg") exists as a current folder CF. If the image shift forward button 123 is turned on, the CPU 109 determines a folder "346XXXXX," which is the next folder (the next folder in a forward direction) in order of folder with respect to the current folder CF ("345XXXXX"), as a jump folder JF.

In the example shown in FIG. 3, the CPU 109 makes the next folder in order of folder with respect to the current folder CF as the jump folder JF, but the forward jump folder determination processing is not limited to this. For example, as shown in FIG. 4, by recording a folder jump number in the non-volatile memory 111, the jump folder may be determined as a folder by jumping over as many folders as the recorded folder jump number in the forward direction in order of folder with respect to the current folder CF.

Figure 4:
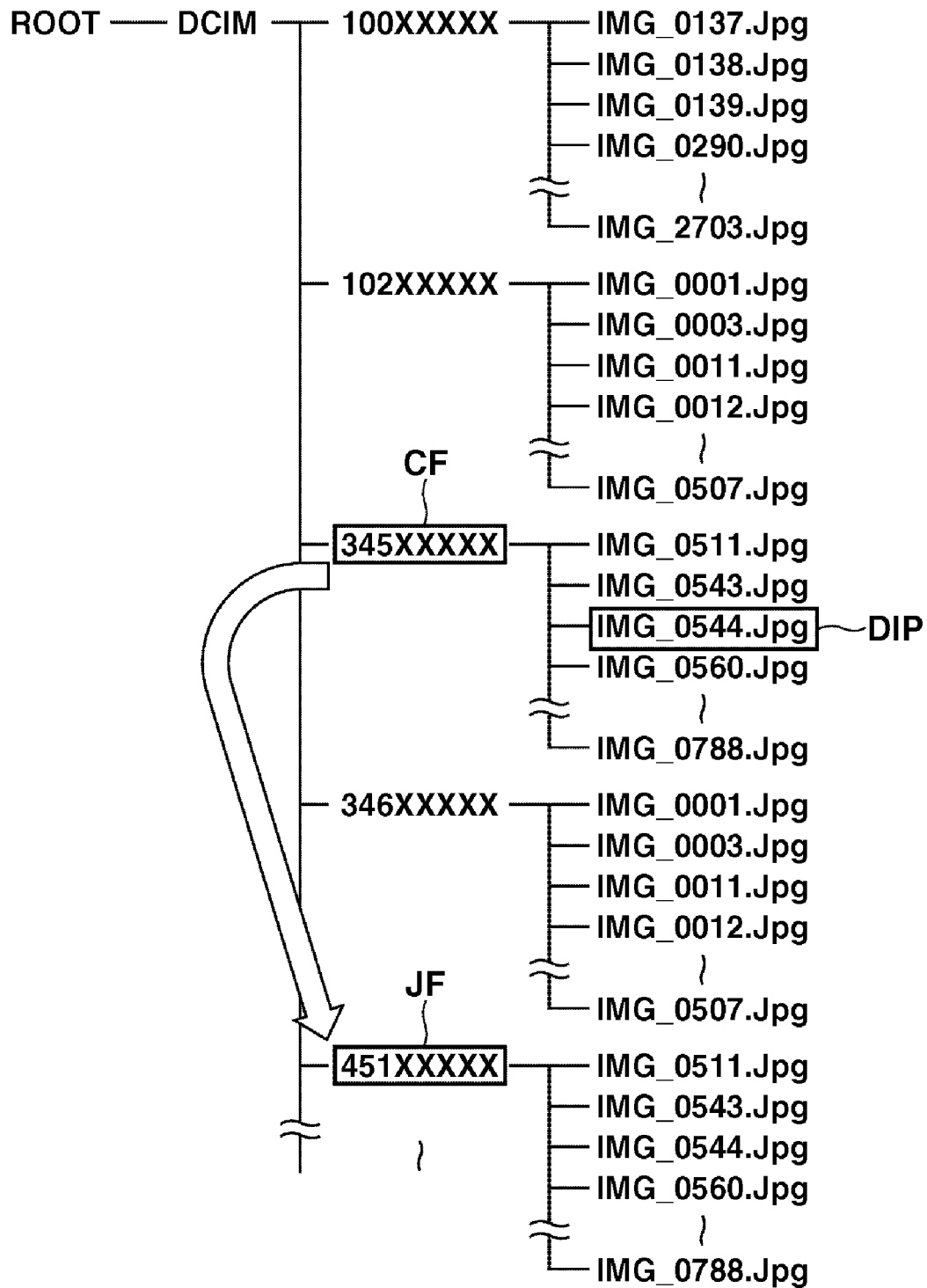
FIG. 4 is a diagram illustrating another example of the forward jump folder determination processing, according to an aspect of the present invention.

FIG. 4 is a diagram illustrating another example of the forward jump folder determination processing. In the example shown in FIG. 4, a case in which the folder jump number recorded in the non-volatile memory 111 is 2 is shown. If the jump button 124 is turned on while the image related to the image file DIP ("IMG_0544.Jpg") is displayed by the normal image reproduction processing, the CPU 109 determines the image file DIP as the current file and the folder "345XXXXX" in which the image file DIP exists as the current folder CF. If the image shift forward button 123 is turned on, the CPU 109 determines a folder "451XXXXX," which is a folder two folders ahead in the forward direction in order of folder with respect to the current folder "345XXXXX," as the jump folder JF.

Figure 5:
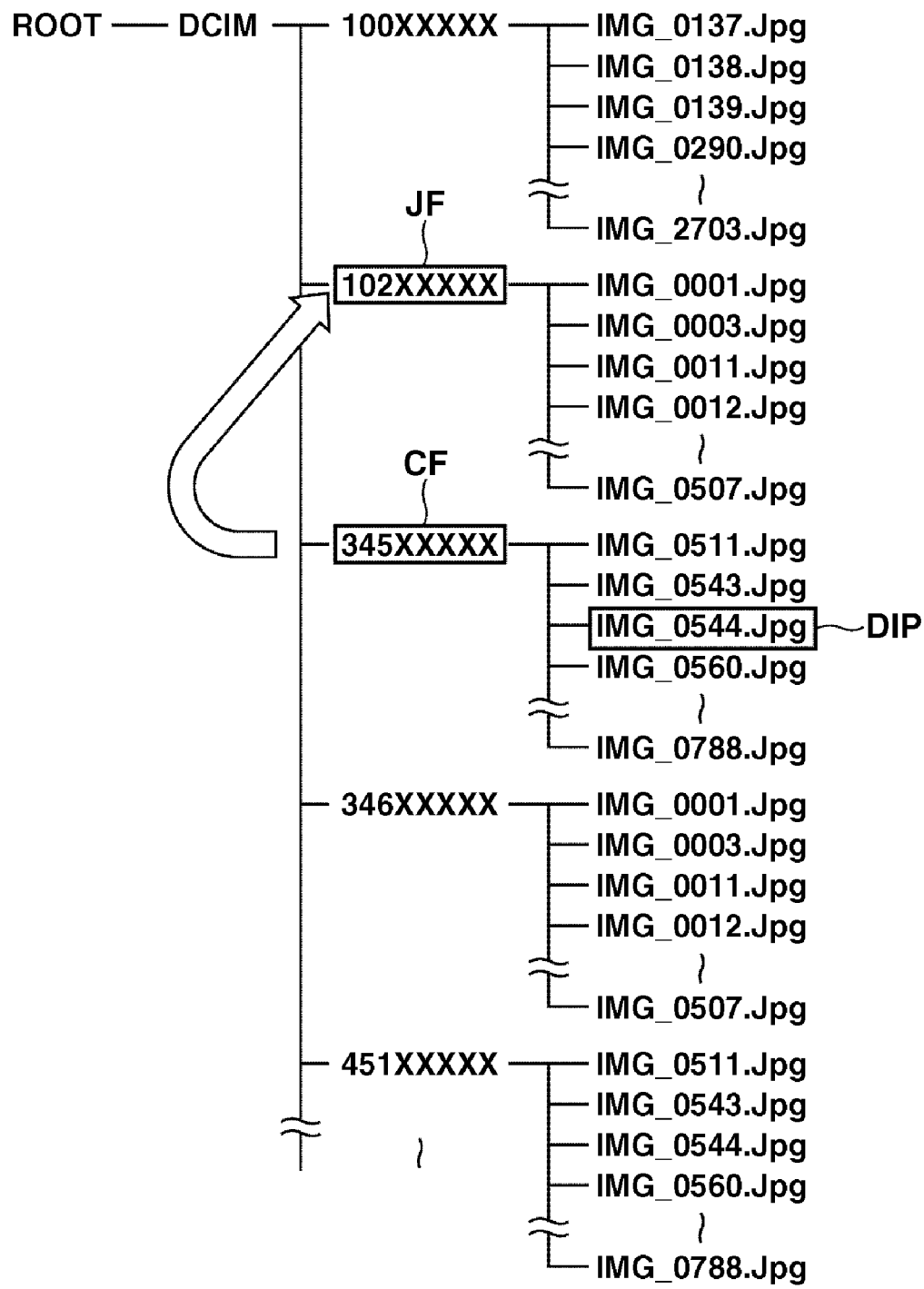
FIG. 5 is a diagram illustrating an example of backward jump folder determination processing, according to an aspect of the present invention.

Next, the backward jump folder determination processing in step S16 shown in FIG. 2 will be described. FIG. 5 is a diagram illustrating the backward jump folder determination processing. A plurality of folders in the memory card 121 is, for example, configured as a hierarchical structure shown in FIG. 5. Many image files are recorded, as shown FIG. 5, in each folder under the DCIM folder. Then, it is assumed that an image related to the image file DIP ("IMG_0544.Jpg") is displayed by the normal image reproduction processing.

If, at this point, the jump button 124 is turned on, the CPU 109 determines the image file DIP ("IMG_0544.Jpg") as the current file and the folder "345XXXXX" in which the image file DIP ("IMG_0544.Jpg") exists as the current folder CF. If the image shift backward button 122 is turned on, the CPU 109 determines a folder "102XXXXX," which is the previous folder in order of folder with respect to the current folder CF ("345XXXXX"), as the jump folder JF.

In the example shown in FIG. 5, the CPU 109 makes the previous folder in order of folder with respect to the current folder CF as the jump folder JF, but the backward jump folder determination processing is not limited to this. For example, as shown in FIG. 6, by recording the folder jump number in the non-volatile memory 111, the jump folder may be determined as a folder by jumping over as many folders as the recorded folder jump number in the backward direction in order of folder with respect to the current folder CF.

Figure 6:
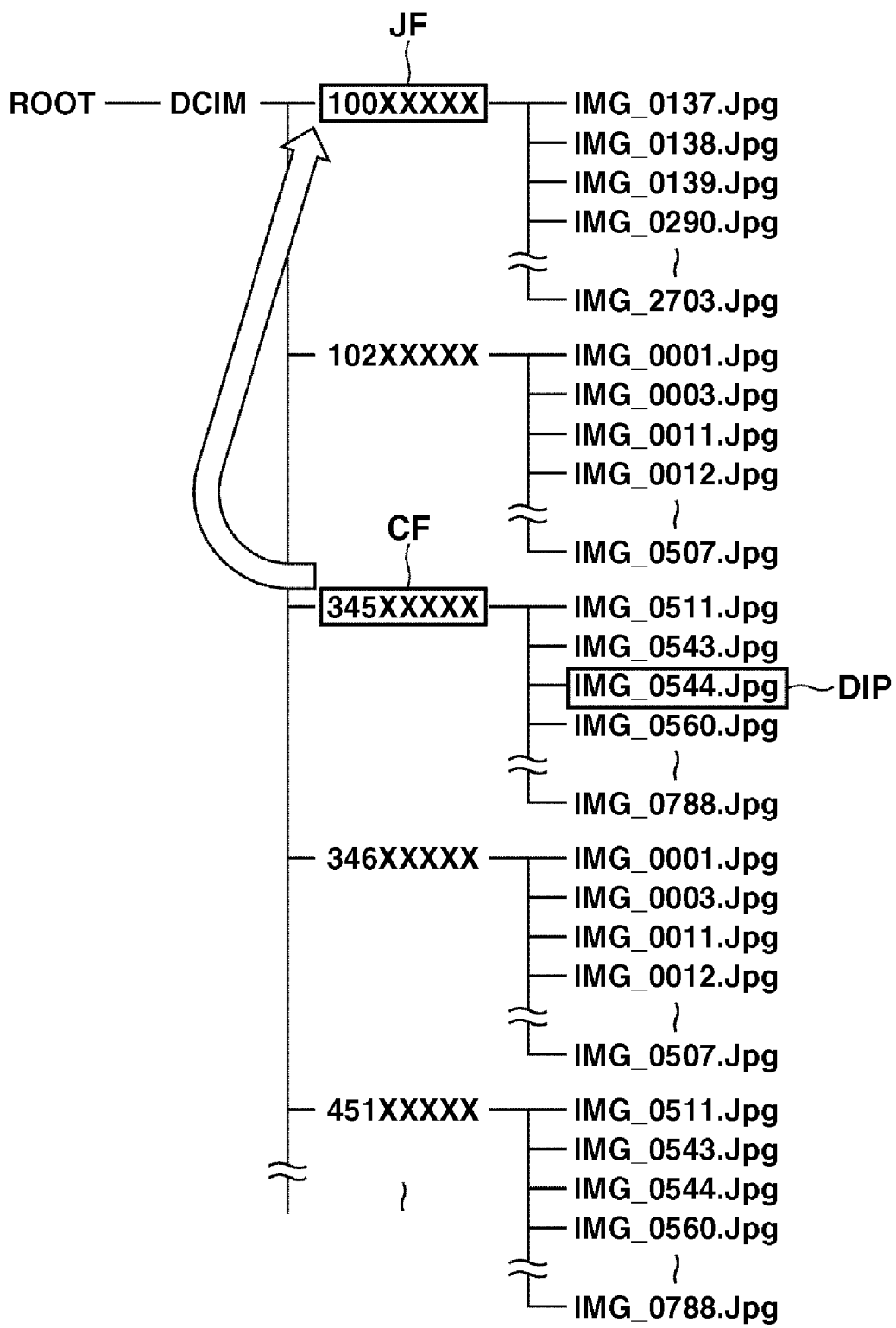
FIG. 6 is a diagram illustrating another example of the backward jump folder determination processing, according to an aspect of the present invention.

FIG. 6 is a diagram illustrating another example of the backward jump folder determination processing. In the example shown in FIG. 6, a case in which the folder jump number recorded in the non-volatile memory 111 is 2 is shown. If the jump button 124 is turned on while the image related to the image file DIP ("IMG_0544.Jpg") is displayed by the normal image reproduction processing, the CPU 109 determines the image file DIP as the current file and the folder "345XXXXX" in which the image file DIP exists as the current folder CF. If the image shift backward button 122 is turned on, the CPU 109 determines a folder "100XXXXX," which is a folder two folders behind with respect to the current folder CF ("345XXXXX"), as the jump folder JF.

The folder jump number recorded in the non-volatile memory 111 may be changeable from a user interface (such as menu operations) provided to the digital camera 100. If, here, the folder jump number is changed to 1, the digital camera 100 will operate as described in FIG. 3 and FIG. 6.

Figure 7:
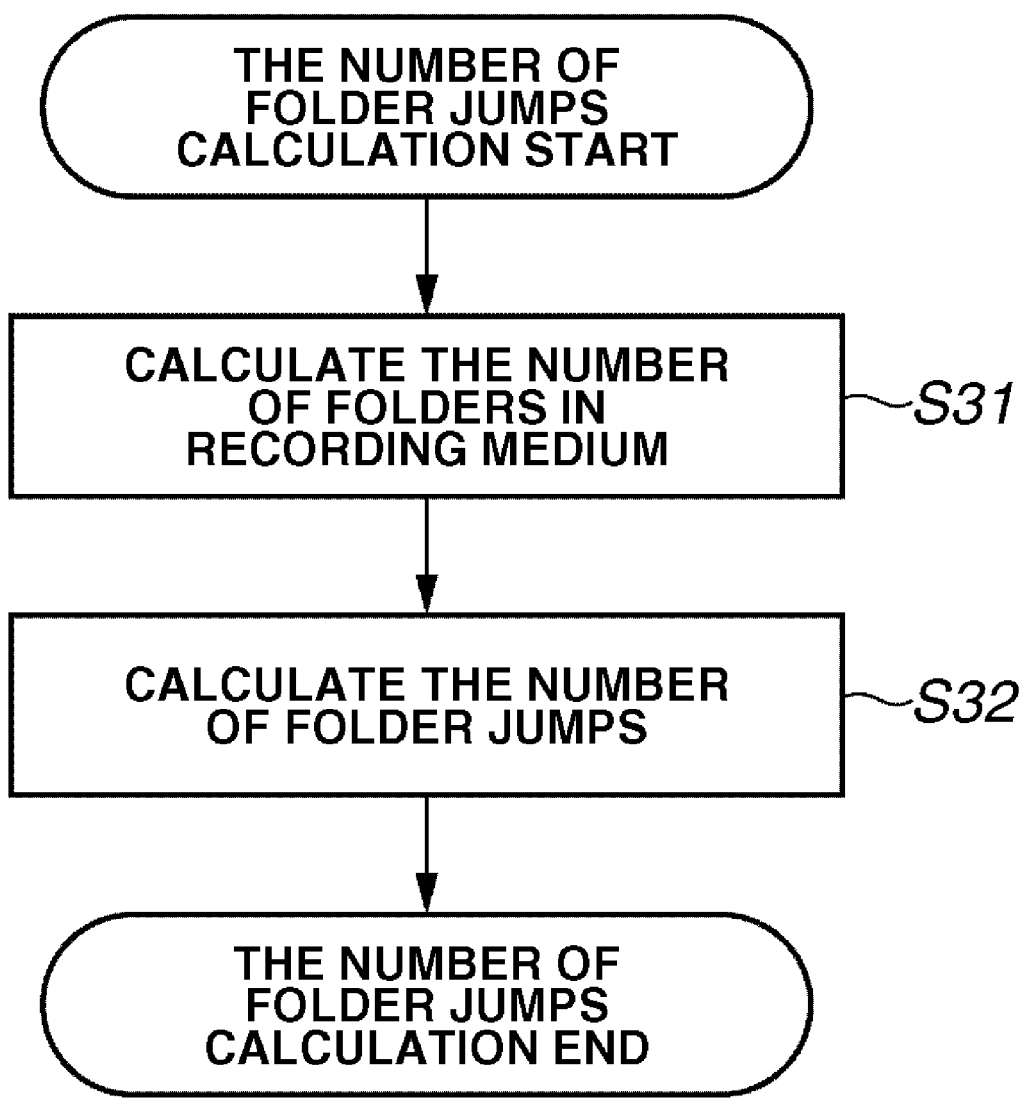
FIG. 7 is a flow chart showing an exemplary operation for calculating the number of folder jumps, according to an aspect of the present invention.

Instead of determining the jump number of folders based on the folder jump number, the CPU 109 may calculate the jump number of folders based on the number of all folders present in the recording medium (memory card 121) as shown in FIG. 7. In such a case, the folder jump number stored in the non-volatile memory 111 will be automatically changed by a value calculated by the CPU 109. Meanwhile, by equipping the digital camera 100 with a first mode in which the folder jump number is changed by the user and a second mode in which the folder jump number is calculated by the CPU 109, the user may select either of the modes.

FIG. 7 is a flow chart showing an exemplary operation of the CPU 109 to calculate the folder jump number. When the operation to calculate the folder jump number is started, the CPU 109 performs processing of calculating the number of folders in the recording medium (S31). In the processing of calculating the number of folders in the recording medium in step S31, the CPU 109 calculates the total number F of folders present in the memory card 121, which is the recording medium.

Next, the CPU 109 performs processing of calculating the number of folder jumps (S32) using the total number F of folders obtained in step S31. In the processing of calculating the number of folder jumps in step S32, the CPU 109 determines a quotient obtained by dividing the total number F of folders by a constant T recorded on the non-volatile memory 111 as the "number of folder jumps." Then, the operation of calculating the number of folder jumps is terminated.

If, for example, there are 900 folders in the recording medium and the constant T recorded on the recording medium is 10, the number of folder jumps is calculated as 900÷10=90. If the current folder CF is the 400th folder, the CPU 109 determines, in the forward jump folder determination processing (S15 from FIG. 2), the 490th folder, which is 90 folders ahead in the forward direction, as the jump folder JF. Likewise, the CPU 109 determines, in the backward jump folder determination processing (S16 from FIG. 2), the 310th folder, which is 90 folders behind, as the jump folder JF.

The CPU 109 may also determine the number of folder jumps in step S32 shown in FIG. 7 by referring to a table stored in the non-volatile memory 111 that stipulates total numbers of folders and the corresponding number of folder jumps therefor.

If there is no image in the jump folder JF determined in step S15 or S16 shown in FIG. 2, a correction may be made to allow the CPU 109 to further search for a next or previous folder as a candidate to re-determine a folder in which an image exists as the jump folder JF.

Figure 8:
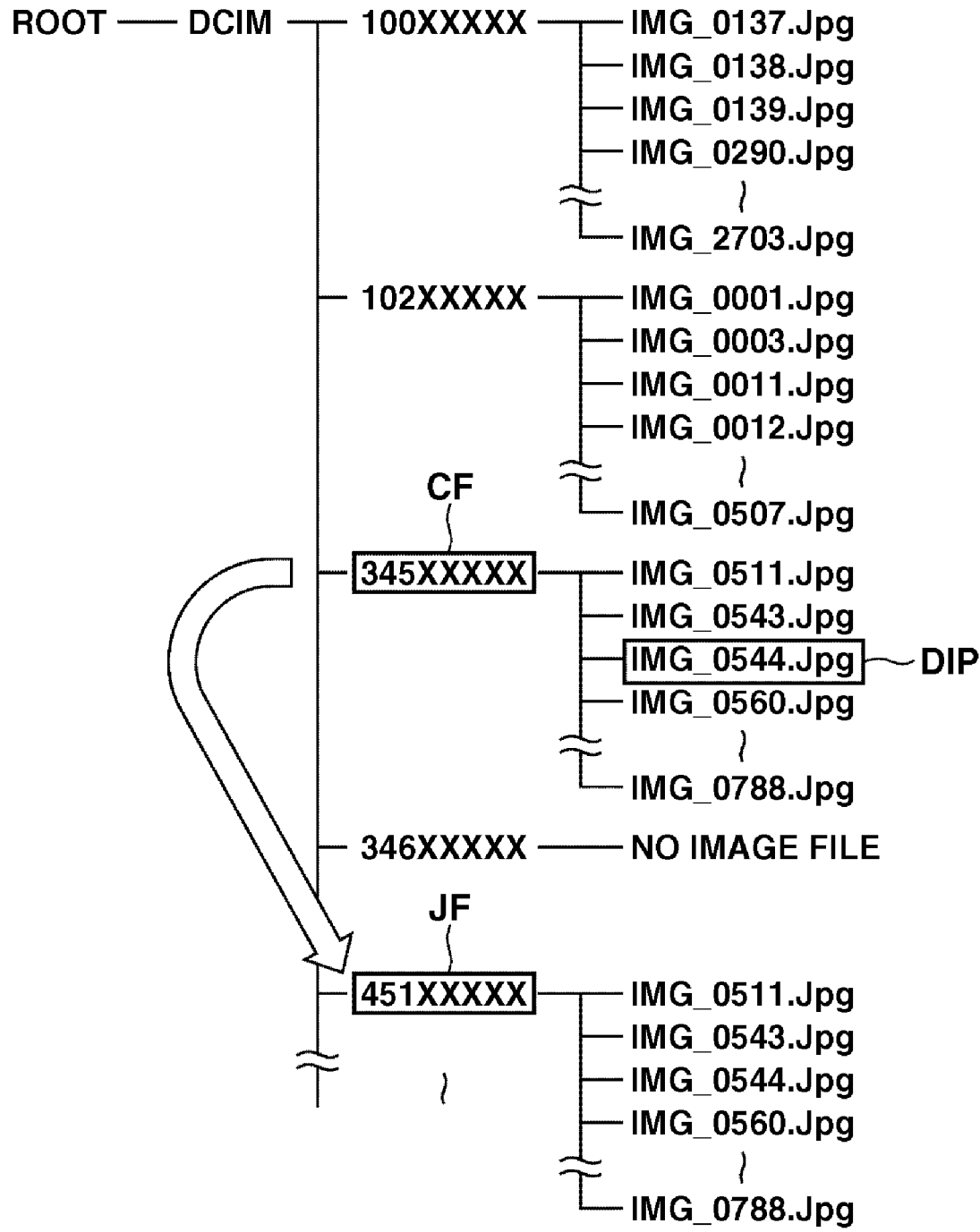
FIG. 8 is a diagram illustrating another example of the forward jump folder determination processing, according to an aspect of the present invention.

In an example shown in FIG. 8, for example, it is assumed that an image related to the image file DIP ("IMG_0544.Jpg") is displayed by the normal image reproduction processing. If, at this moment, the jump button 124 is turned on, a folder "345XXXXX" in which the image file DIP ("IMG_0544.Jpg") exists becomes the current folder CF. If the image shift forward button 123 is turned on, the CPU 109 attempts to determine a folder "346XXXXX," which is the next folder to the current folder ("345XXXXX"), as the jump folder JF, but no image file exists in the folder "346XXXXX." Therefore, the CPU 109 determines a folder "451XXXXX," which is the further next folder when viewed from the current folder and has image files, as the jump folder JF.

If there is no image in the jump folder JF determined in step S15 or S16 shown in FIG. 2, the CPU 109 may also indicate to the user that no image file exists in the folder by a warning message or a warning beep.

If a latest folder is jumped over when determining a jump folder by the forward jump folder determination processing, the CPU 109 may determine a folder by jumping over as many folders as missing folders after returning to an oldest folder as the jump folder or may determine the latest folder as the jump folder. Likewise, if the oldest folder is jumped over when determining a jump folder by the backward jump folder determination processing, the CPU 109 may determine a folder by jumping over as many folders as missing folders after returning to the latest folder as the jump folder or may determine the oldest folder as the jump folder.

Next, the folder jump reproduced image determination processing performed in step S17 shown in FIG. 2 will be described. As described above, in the folder jump reproduced image determination processing, the CPU 109 determines one or more images in the jump folder including a top image as reproduced images, and the number of reproduced images depends on a current reproduction state (the state before jumping). If, for example, a folder jump occurs while displaying one image, as shown in FIG. 9, a top image in the jump folder is displayed.

Figure 9:
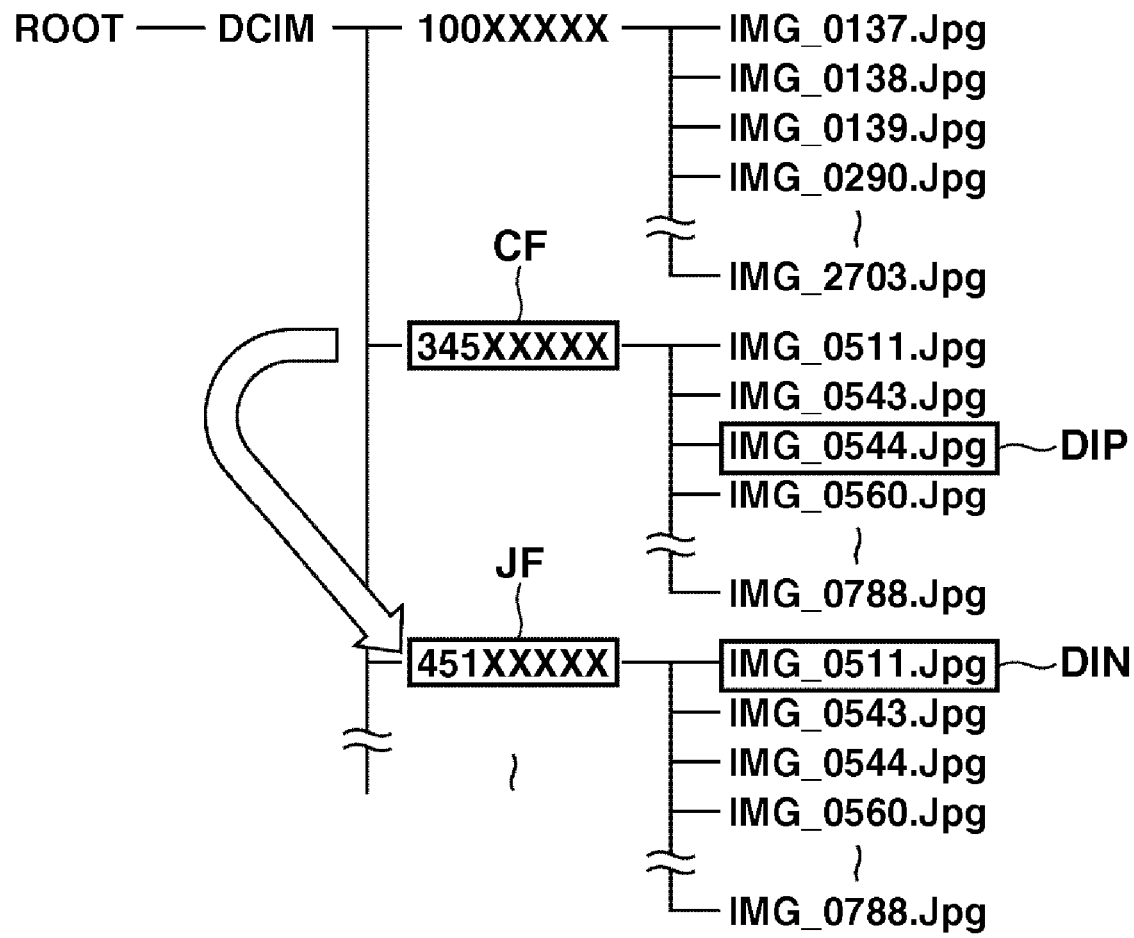
FIG. 9 is a diagram illustrating an example of folder jump reproduced image determination processing, according to an aspect of the present invention.

FIG. 9 is a diagram illustrating an exemplary folder jump reproduced image determination processing in step S17 shown in FIG. 2. A plurality of folders in the memory card 121 is, for example, configured as a hierarchical structure shown in FIG. 9. Many image files are recorded, as shown FIG. 9, in each folder under the DCIM folder. Then, it is assumed that only one image related to the image file DIP ("IMG_0544.Jpg") is displayed by the normal image reproduction processing.

If, at this point, the jump button 124 is turned on, the CPU 109 determines the image file DIP ("IMG_0544.Jpg") as the current file and the folder "345XXXXX" in which the image file DIP ("IMG_0544.Jpg") exists as the current folder CF. If the image shift forward button 123 is turned on, the CPU 109 determines a folder "451XXXXX," which is the next folder to the current folder CF ("345XXXXX"), as the jump folder JF and determines an image file DIN ("IMG_0511.Jpg"), which is the top image in the folder, as a reproduced image.

Figure 10:
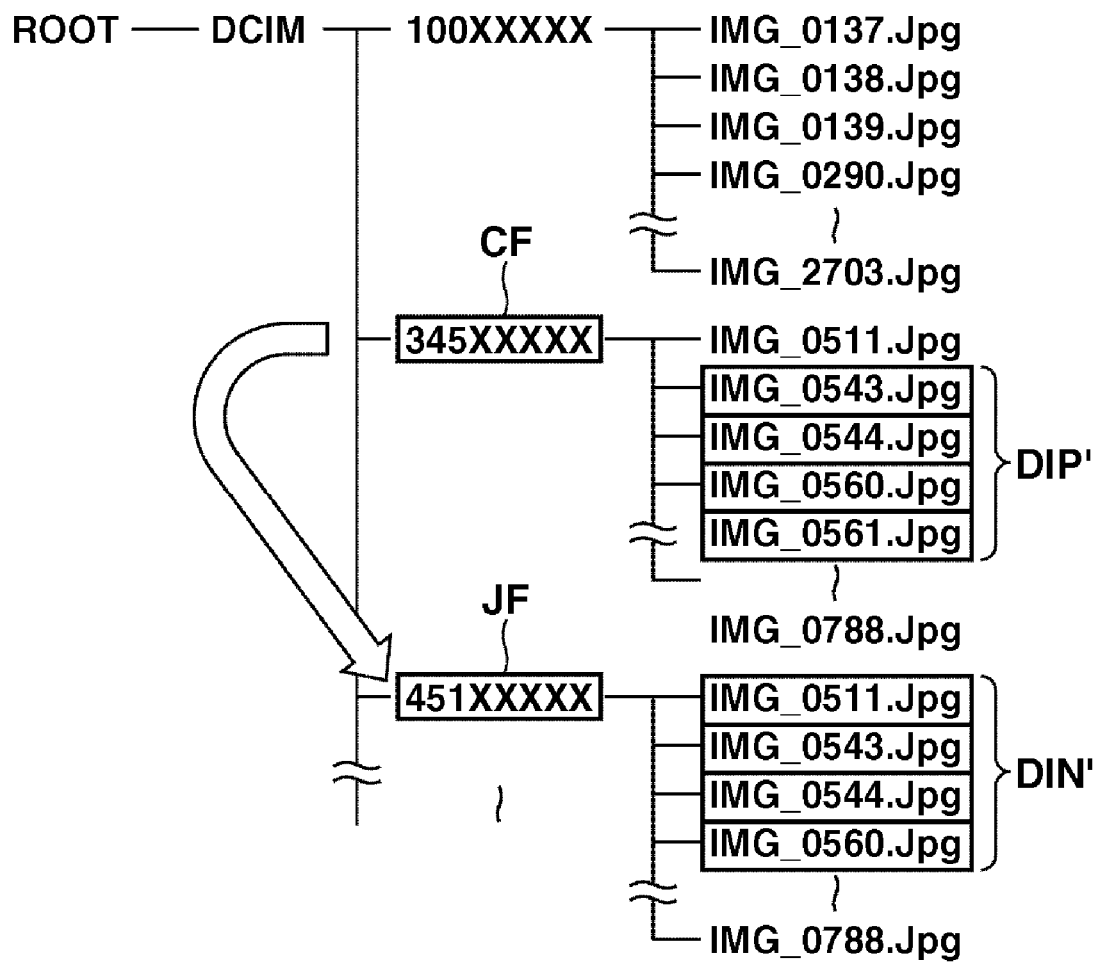
FIG. 10 is a diagram illustrating another example of the folder jump reproduced image determination processing, according to an aspect of the present invention.

If, for example, a folder jump occurs while displaying four images, as shown in FIG. 10, four images in the forward direction from the top image in the jump folder are displayed. In an example shown in FIG. 10, four images related to image files DIP' ("IMG_0543.Jpg," "IMG_0544.Jpg," IMG_0560.Jpg," and IMG_0561.Jpg") are displayed by the normal image reproduction processing. If, at this point, the jump button 124 is turned on, the folder "345XXXXX" in which the image files DIP' exist becomes the current folder CF. If the image shift forward button 123 is turned on, the CPU 109 determines a folder "451XXXXX," which is the next folder to the current folder CF ("345XXXXX"), as the jump folder JF. The CPU 109 also determines four image files DIN' ("IMG_0511.Jpg," "IMG_0543.Jpg," "IMG_0544.Jpg," and "IMG_0560.Jpg") including the top image in the jump folder JF ("451XXXXX") as the reproduced images.

Figure 11:
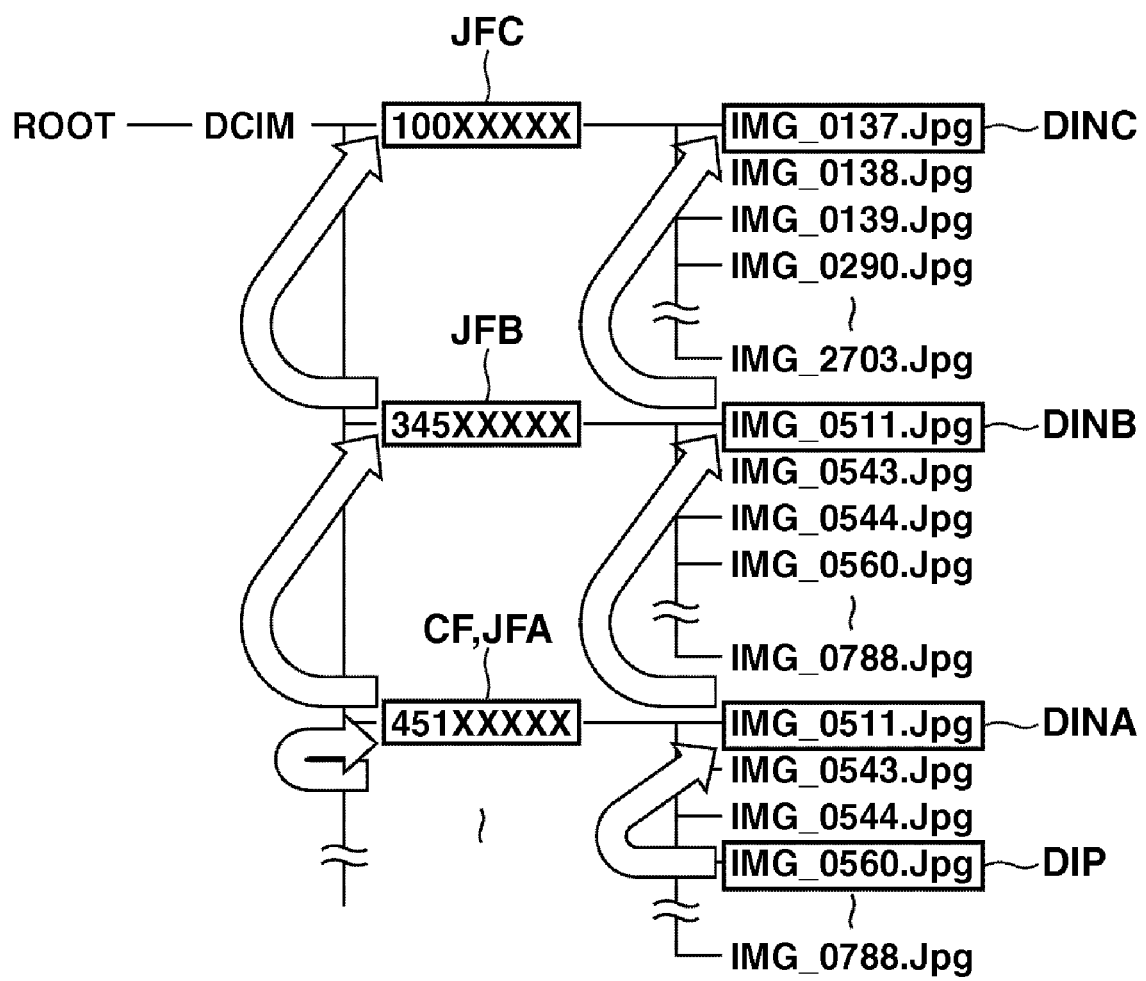
FIG. 11 is a diagram illustrating another example of the folder jump reproduced image determination processing, according to an aspect of the present invention.

In the examples shown in FIGS. 9 and 10, a case in which the image shift forward button 123 is turned on is shown as an example, but a case in which the image shift backward button 122 is turned on only changes the jump folder JF to the folder "100XXXXX." Here, if the jump button 124 is turned on while the top image of the current folder is not included in images currently displayed by the normal image reproduction processing and the image shift backward button 122 is turned on, the CPU 109 may determine the jump folder and reproduced images as shown FIG. 11. That is, the CPU 109 may determine the current folder as the jump folder and also one or more images including the top image of the current folder as the reproduced images.

In an example shown in FIG. 11, an image related to the image file DIP ("IMG_0560.Jpg") is displayed by the normal image reproduction processing. If, at this point, the jump button 124 is turned on, the folder "451XXXXX" in which the image file DIP exists becomes the current folder CF. If the image shift backward button 122 is turned on, since the image file DIP ("IMG_0560.Jpg") is not the top image in the current folder CF ("451XXXXX"), the CPU 109 determines the current folder CF as the jump folder JFA as it is. The CPU 109 also determines an image file DINA ("IMG_0511.Jpg"), which is the top image in the folder "451XXXXX," as the reproduced image.

If, in the example shown in FIG. 11, the image shift backward button 122 is turned on, since the image file DINA ("IMG_0511.Jpg"), which is the top image in the jump folder JFA ("451XXXXX"), is displayed, the CPU 109 determines a folder "345XXXXX," which is the previous folder to the jump folder JFA ("451XXXXX"), as the next jump folder JFB. The CPU 109 also determines an image file DINB ("IMG_0511.Jpg"), which is the top image in the jump folder JFB ("345XXXXX"), as the reproduced image.

If the image shift backward button 122 is further turned on, the CPU 109 determines in a similar way a folder "100XXXXX," which is the previous folder to the jump folder JFB ("345XXXXX"), as the next jump folder JFC. The CPU 109 also determines an image file DINC ("IMG_0137.Jpg"), which is the top image in the jump folder JFC ("100XXXXX"), as the reproduced image.

In the folder jump reproduced image determination processing, the CPU 109 may also determine one or more images including a rear end image in the jump folder as the reproduced images. If, for example, a folder jump occurs while displaying one image, as shown in FIG. 12, one rear end image in the jump folder is displayed.

Figure 12:
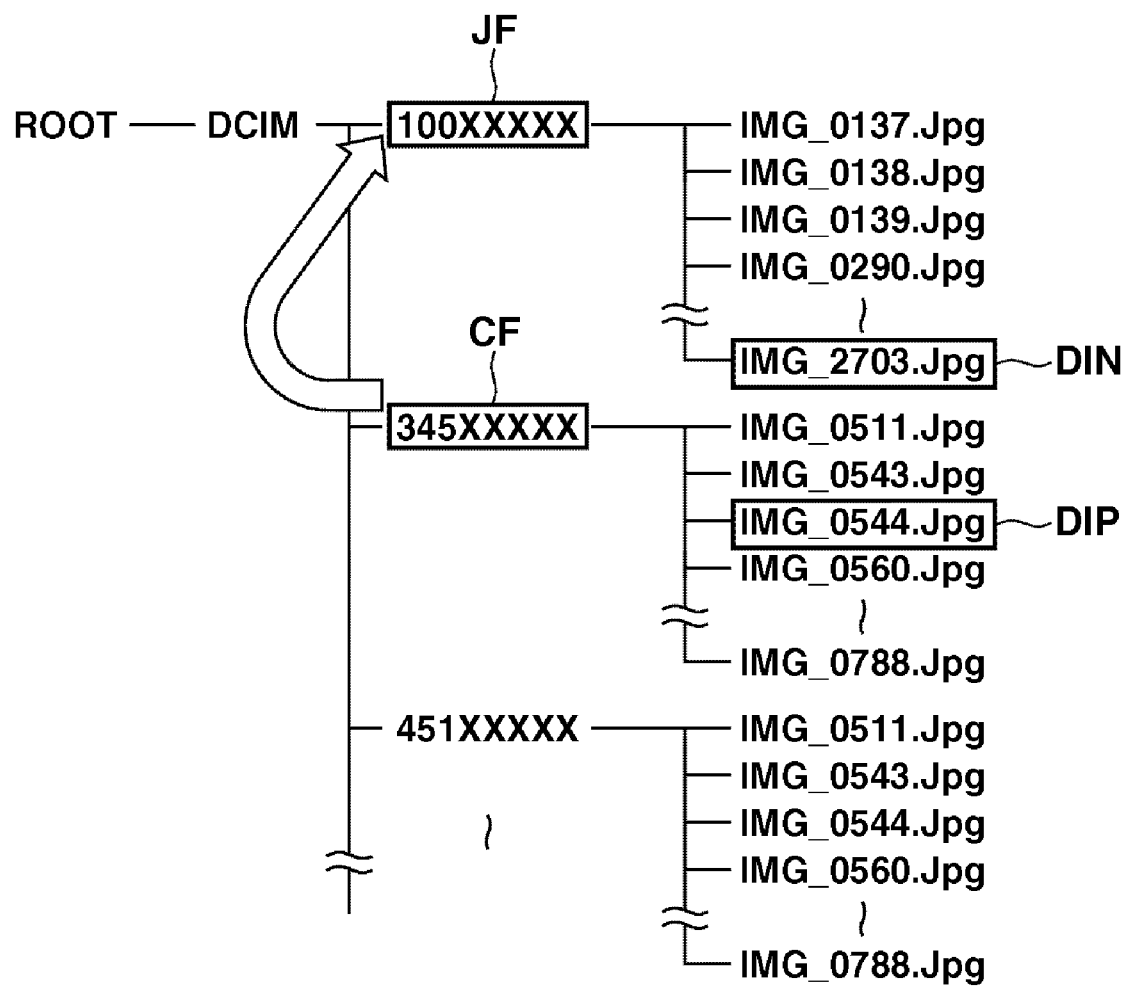
FIG. 12 is a diagram illustrating another example of the folder jump reproduced image determination processing, according to an aspect of the present invention.

In an example shown in FIG. 12, an image related to the image file DIP ("IMG_0544.Jpg) is displayed by the normal image reproduction processing. If, at this point, the jump button 124 is turned on, a folder "345XXXXX" in which the image file DIP exists becomes the current folder CF. If the image shift backward button 122 is turned on, the CPU 109 determines a folder "100XXXXX," which is the previous folder to the current folder CF ("345XXXXX"), as the jump folder JF. The CPU 109 also determines an image file DIN ("IMG_2703.Jpg"), which is the rear end image in the jump folder JF ("100XXXXX"), as the reproduced image.

Figure 13:
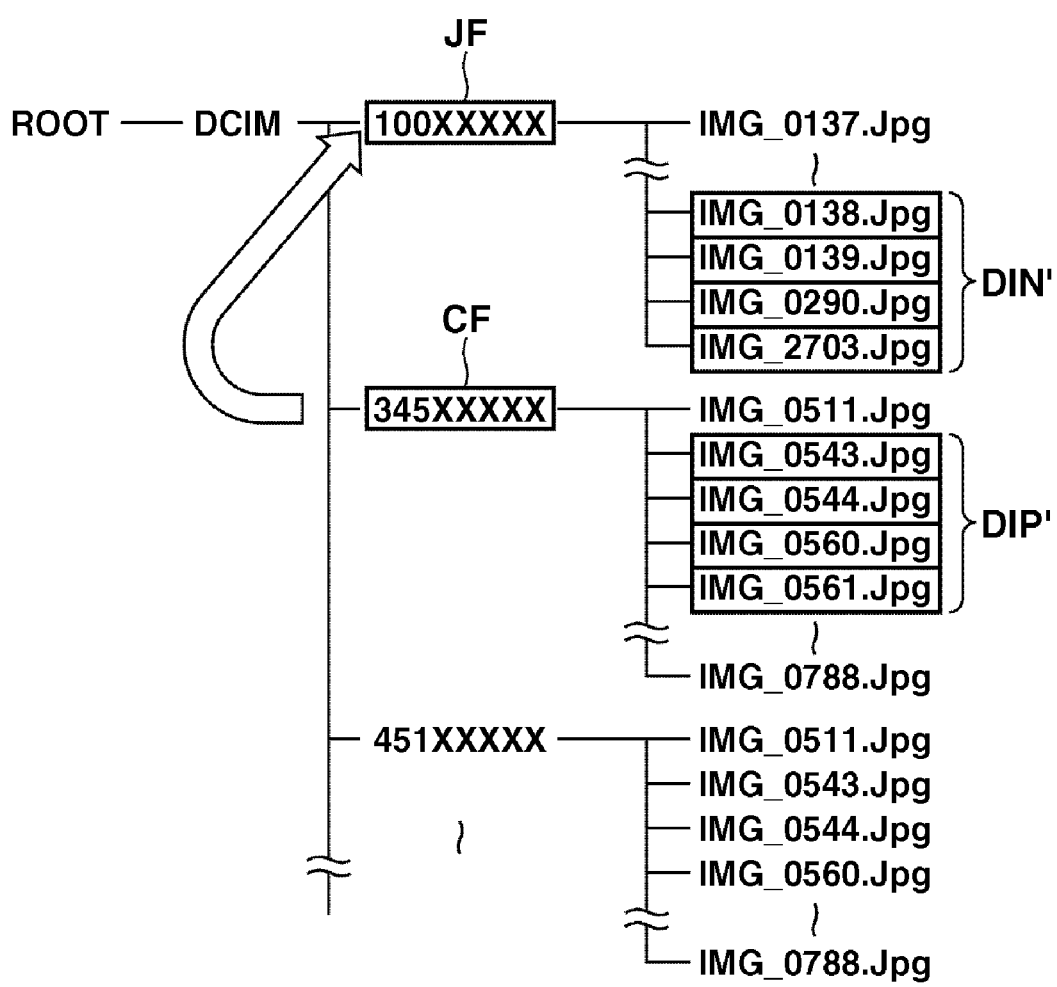
FIG. 13 is a diagram illustrating another example of the folder jump reproduced image determination processing, according to an aspect of the present invention.

If, for example, a folder jump occurs while displaying four images, as shown in FIG. 13, four images in the backward direction from the rear end image in the jump folder JF are displayed. In an example shown in FIG. 13, four images related to the image files DIP' ("IMG_0543.Jpg," "IMG_0544.Jpg," IMG_0560.Jpg," and IMG_0561.Jpg") are displayed by the normal image reproduction processing. If, at this point, the jump button 124 is turned on, a folder "345XXXXX" in which the image files DIP' exist becomes the current folder CF. If the image shift backward button 122 is turned on, the CPU 109 determines a folder "100XXXXX," which is the previous folder to the current folder CF ("345XXXXX"), as the jump folder JF. The CPU 109 also determines four image files DIN' ("IMG_0138.Jpg," "IMG_0139.Jpg," "IMG_0290.Jpg," and "IMG_2703.Jpg") including the rear end image in the jump folder JF ("100XXXXX") as the reproduced images.

Figure 14:
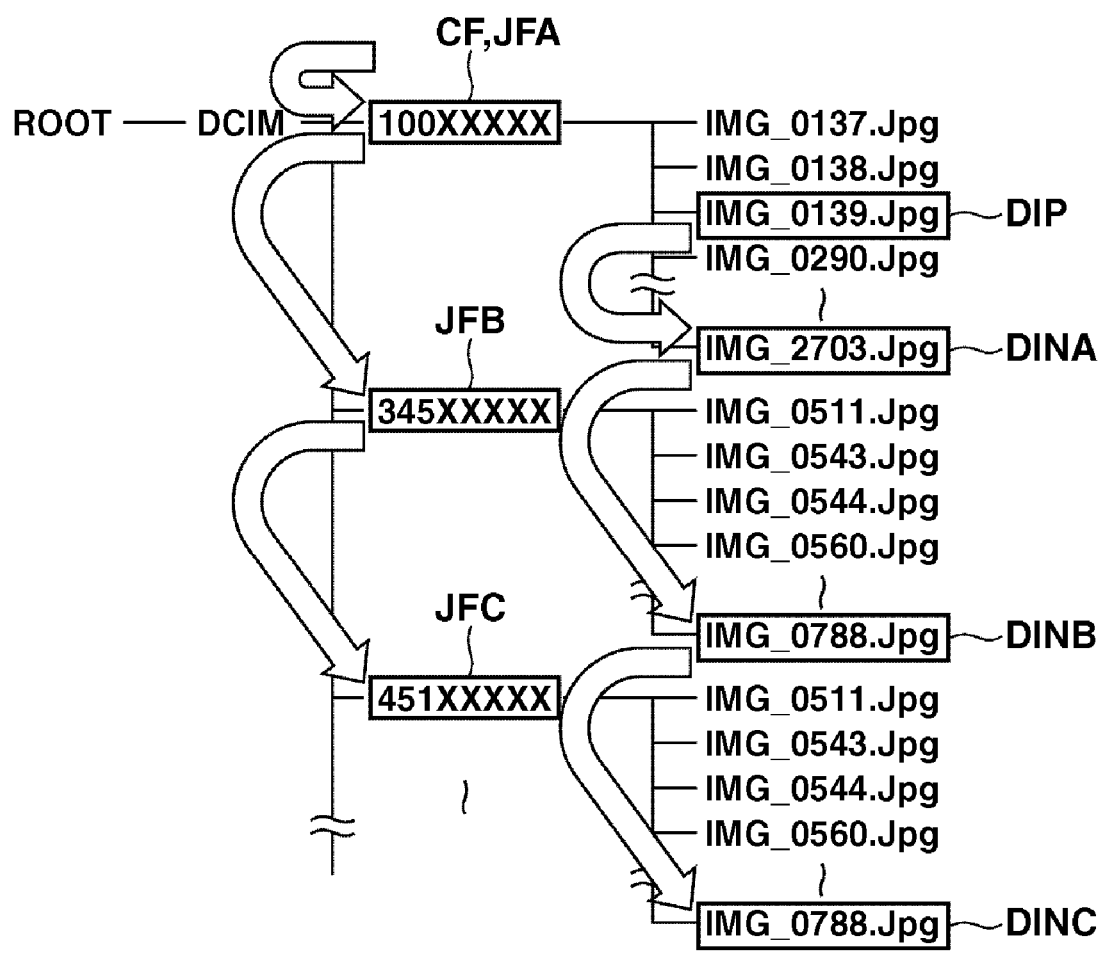
FIG. 14 is a diagram illustrating another example of the folder jump reproduced image determination processing, according to an aspect of the present invention.

Here, if the jump button 124 is turned on while the rear end image in the current folder is not included in images currently displayed by the normal image reproduction processing and the image shift forward button 123 is turned on, the CPU 109 may determine the jump folder and reproduced images as shown FIG. 14. That is, the CPU 109 may determine the current folder as the jump folder and also one or more images including the rear end image in the current folder as the reproduced images.

In an example shown in FIG. 14, an image related to the image file DIP ("IMG_0139.Jpg") is displayed by the normal image reproduction processing. If, at this point, the jump button 124 is turned on, a folder "100XXXXX" in which the image file DIP exists becomes the current folder CF. If the image shift forward button 123 is turned on, since the image file DIP ("IMG_0139.Jpg") is not the rear end image in the current folder CF ("100XXXXX"), the CPU 109 determines the current folder CF as the jump folder JFA as it is. The CPU 109 also determines the image file DINA ("IMG_2703.Jpg"), which is the rearend image of the folder "100XXXXX," as the reproduced image.

If, in the example shown in FIG. 14, the image shift forward button 123 is further turned on, since the image file DINA ("IMG_2703.Jpg"), which is the rear end image in the jump folder JFA ("100XXXXX"), is displayed, the CPU 109 determines a folder "345XXXXX," which is the next folder to the jump folder JFA ("100XXXXX"), as the next jump folder JFB. The CPU 109 also determines an image file DINB ("IMG_0788.Jpg"), which is the rear end image in the jump folder JFB ("345XXXXX"), as the reproduced image.

If the image shift forward button 123 is further turned on, the CPU 109 determines in a similar way a folder "451XXXXX," which is the next folder to the jump folder JFB ("345XXXXX"), as the next jump folder JFC. The CPU 109 also determines the image file DINC ("IMG_

0788.Jpg"), which is the rear end image in the jump folder JFC ("451XXXXX"), as the reproduced image.

In the folder jump reproduced image determination processing, the CPU 109 may also determine the reproduced image based on a rate of the image being reproduced to the total number of images in the current folder and the total number of images in the jump folder.

Figure 15:
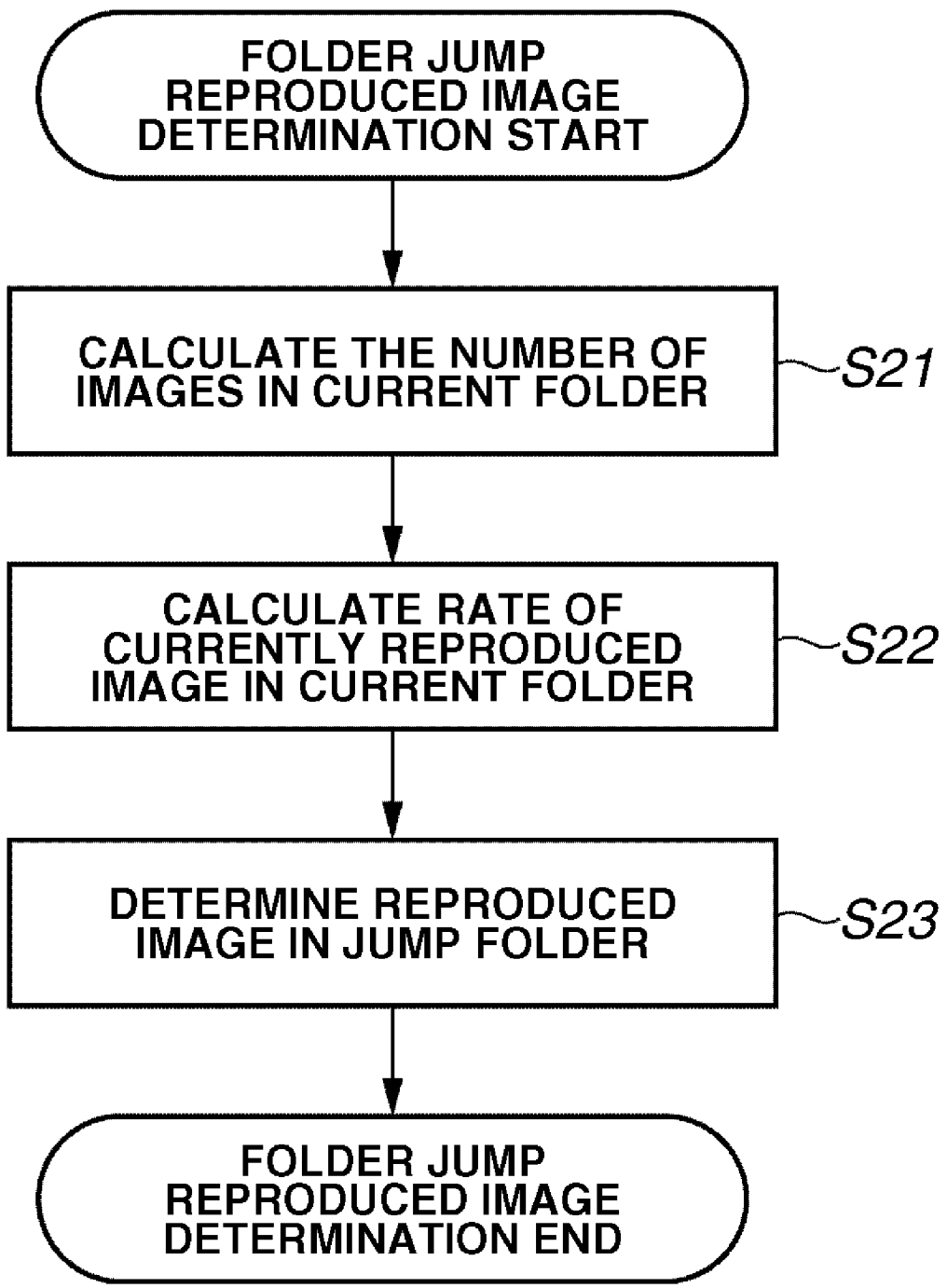
FIG. 15 is a flow chart showing exemplary folder jump reproduced image determination processing, according to an aspect of the present invention.

FIG. 15 is a flow chart showing the folder jump reproduced image determination processing by the CPU 109 for the above case. When the folder jump reproduced image determination processing is started, the CPU 109 performs processing of calculating the number of images in the current folder (S21). In the processing of calculating the number of images in the current folder in step S21, the CPU 109 calculates a total number NC of image files present in the current folder.

Next, the CPU 109 performs processing of calculating the rate of currently reproduced image in the current folder (S22). In the processing of calculating the rate of currently reproduced image in the current folder in step S22, the CPU 109 determines a rate P with respect to the position of the reproduced image in the current folder by dividing a sequence NP of the image currently being reproduced from the top image in the current folder by the total number NC.

Subsequently, the CPU 109 performs processing of determining reproduced images in the jump folder based on the rate P obtained in step S22 (S23). In the processing of determining reproduced images in the jump folder in step S23, the CPU 109 calculates a total number NJ of image files present in the jump folder, multiplies the calculated total number NJ by the rate P, and calculates a number NP' by correcting a multiplication result to an integer. Then, an NP'-th image from the top image in the jump folder is determined as the reproduced image. Then, the folder jump reproduced image determination processing is terminated.

Figure 16:
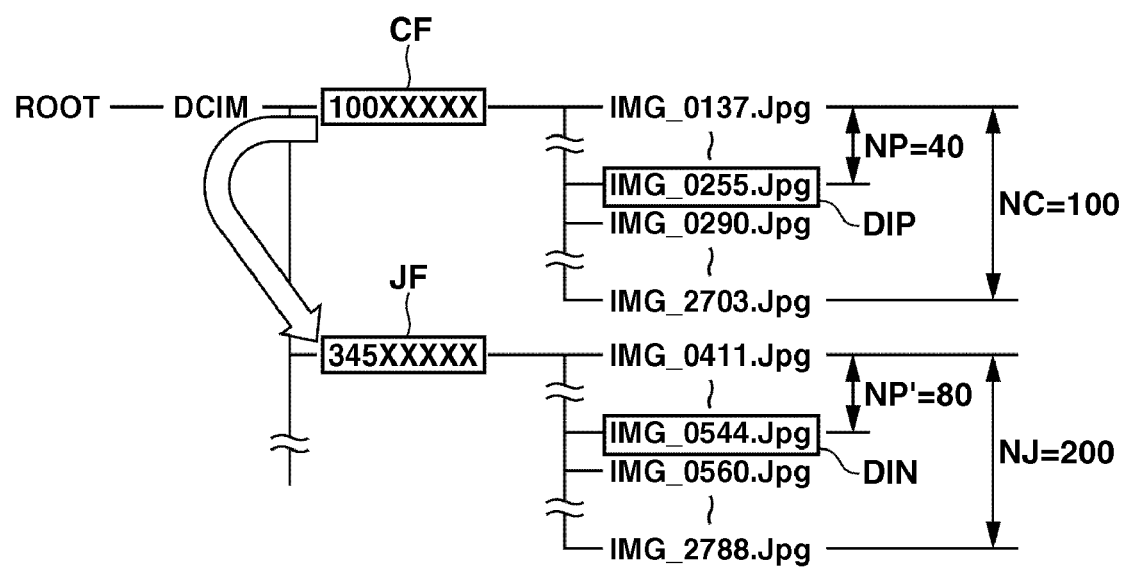
FIG. 16 is a diagram illustrating another example of the folder jump reproduced image determination processing, according to an aspect of the present invention.

In an example shown in FIG. 16, for example, an image related to an image file DIP ("IMG_0255.Jpg") is displayed by the normal image reproduction processing. If, at this point, the jump button 124 is turned on, the folder "100XXXXX" in which the image file DIP exists becomes the current folder CF. Here, 100 image files exist in the current folder CF ("100XXXXX") and a 40th image file ("IMG_0255.Jpg") from the top image in the current folder CF ("100XXXXX") is displayed on the EVF/LCD 115. In such a case, the rate P calculated in the above-described folder jump reproduced image determination processing is obtained as 40÷100=0.4.

If the image shift forward button 123 is further turned on, the CPU 109 determines a folder "345XXXXX," which is the next folder to the current folder CF ("100XXXXX"), as the jump folder JF. Here, 200 image files exist in the jump folder JF ("345XXXXX"). Therefore, in such a case, a sequence NP' of the reproduced image from the top image is calculated as 0.4×200=80 and the CPU 109 determines the image file DIN ("IMG_0544.Jpg"), which is an 80th image file from the top image in the jump folder ("345XXXXX"), as the reproduced image.

In the above description, images are assumed to be displayed in an identical display format during the normal image reproduction and after a folder jump operation, but the display format after the folder jump operation may be made settable by, for example, a user's menu operation. In such a case, it becomes possible to optionally set a display format after a folder jump operation regardless of the display format for the normal image reproduction, and for example, a display format that is different from that for the normal image reproduction can be made available after the folder jump operation. For example, the display format can be set so that one image is displayed for reproduction in the normal image reproduction, and after a folder jump operation, nine images are multi-displayed.

Figure 17:
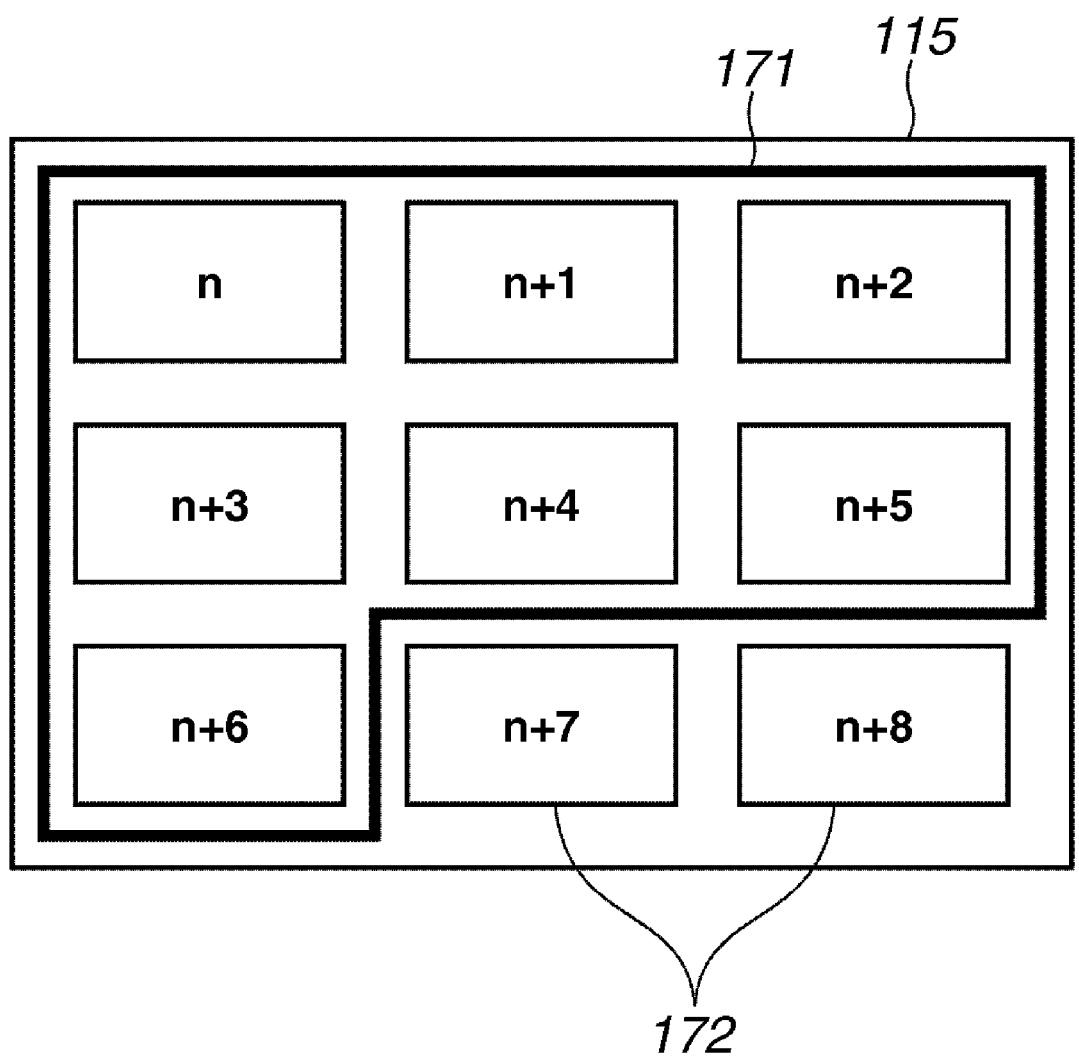
FIG. 17 is a diagram showing a display example of an image after a folder jump operation, according to an aspect of the present invention.

If, in the folder jump reproduced image determination processing, the number of images existing in the jump folder is smaller than that of images that can be displayed, only images existing in the jump folder may be displayed or images existing in a folder adjacent to the jump folder may be displayed together as reproduced images. When images existing in the folder adjacent to the jump folder are displayed together as reproduced images on the EVF/LCD 115, as shown in FIG. 17, a group 171 of images existing in the jump folder may be highlighted against a group 172 of images not existing in the jump folder. Conversely, the group 172 of images not existing in the jump folder may be highlighted.

According to the first exemplary embodiment described above, if the jump button 124 is turned on while displaying an image read from the memory card 121 in which many image files are recorded by the normal image reproduction processing, the CPU 109 determines a folder in which the image currently displayed exists as the current folder. If the image shift backward button 122 or the image shift forward button 123 is turned on, the CPU 109 determines a folder by jumping over as many folders as the number of folder jumps forward or backward as the jump folder. The CPU 109 also determines an image file to be reproduced from image files in the jump folder and displays it as the reproduced image on the EVF/LCD 115.

Accordingly, when the image shift backward button 122 or the image shift forward button 123 is operated, an image file in a folder after jumping over as many folders as the number of folder jumps forward or backward with respect to a folder in which an image currently displayed exists is displayed as the reproduced image. Therefore, when searching for a desired folder or image file from the memory card 121 in which many image files are classified and recorded in a plurality of folders, searching will be done by simple operations so that operability related to searching can be improved.

If the number of folder jumps is to be determined depending on the number of folders in the memory card 121, which is a recording medium, an appropriate number of folder jumps corresponding to the total number of folders can be set. This can reduce user's operation related to searching and a user who arranges image files with folders in mind can quickly search for and view a desired folder or image file with a smaller number of operations.

If a reproduced image in a jump destination folder is to be determined depending on the number of images in a folder in the memory card 121, user's operation related to searching can be reduced and the user who arranges image files with folders in mind can quickly search for and view a desired image file with a smaller number of operations.

If, when a folder jump occurs while using a multi-display, only images in a jump destination folder are to be displayed or a warning is to be issued when no image exists, the user can become well aware of images in the folder. If an image file is to be displayed as a reproduced image on the EVF/LCD 115 by calculating a relative position of the image currently displayed in a folder as a rate and selecting an image that is also in the relative position with the same rate in the jump destination folder, and if the relative position in a folder of a desired image file is known, the user can quickly search for and view a desired image file with a smaller number of operations by displaying and jumping to the image corresponding to the relative position in the different folder.

Second Exemplary Embodiment

Figure 18:
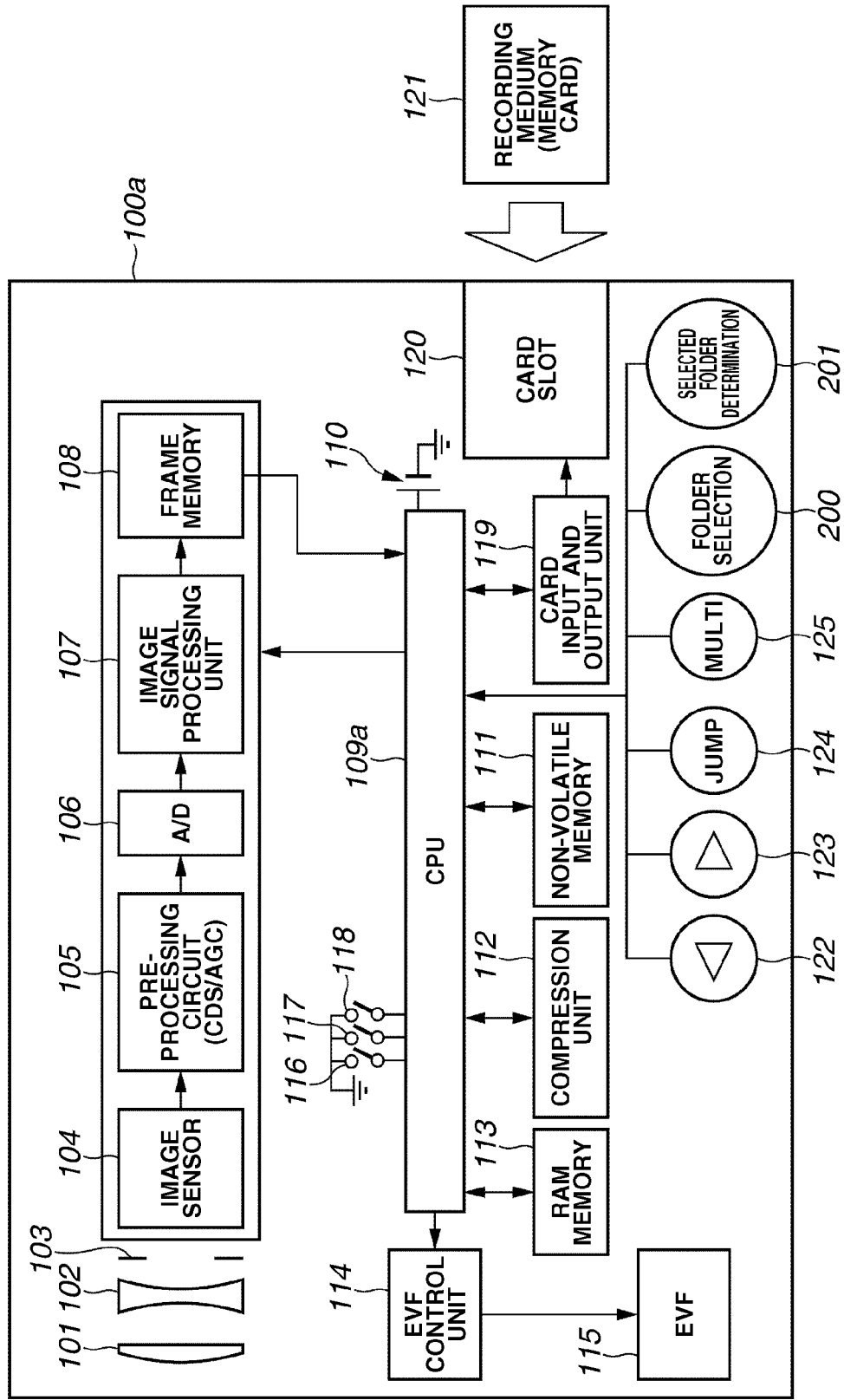
FIG. 18 is a block diagram showing an example of configuration of a digital camera according to a second exemplary embodiment of the present invention.

Next, a second exemplary embodiment will be described. FIG. 18 is a block diagram showing a configuration example of a digital camera to which an image reproduction apparatus according to the second exemplary embodiment of the present invention is applied. In FIG. 18, blocks with the same functions as those shown in FIG. 1 are provided with the same symbols, and therefore, these descriptions will not be repeated. An image reproduction apparatus according to the present embodiment is not limited to a digital cameras and may be a digital video camera or a cellular phone with a camera.

Figure 19:
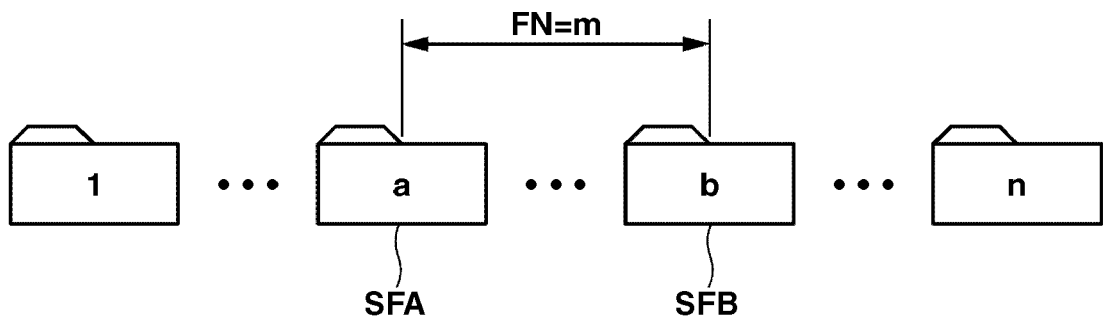
FIG. 19 is a diagram showing an example of folder selection according to the second exemplary embodiment.

A digital camera 100a according to the second exemplary embodiment shown in FIG. 18 is constructed, as shown in FIG. 19, to calculate the number of folder jumps by selecting two selection folders SFA and SFB from a plurality of folders with a sequence in the memory card 121 and considering the number of folders existing between the two selection folders as the total number of folders.

The digital camera 100a shown in FIG. 18 has a configuration obtained by adding a folder selection button 200 and a selected folder determination button 201 to the configuration of the digital camera 100 shown in FIG. 1. Each of the folder selection button 200 and the selected folder determination button 201 is a button that is turned on by performing a pressing operation.

Figure 20:
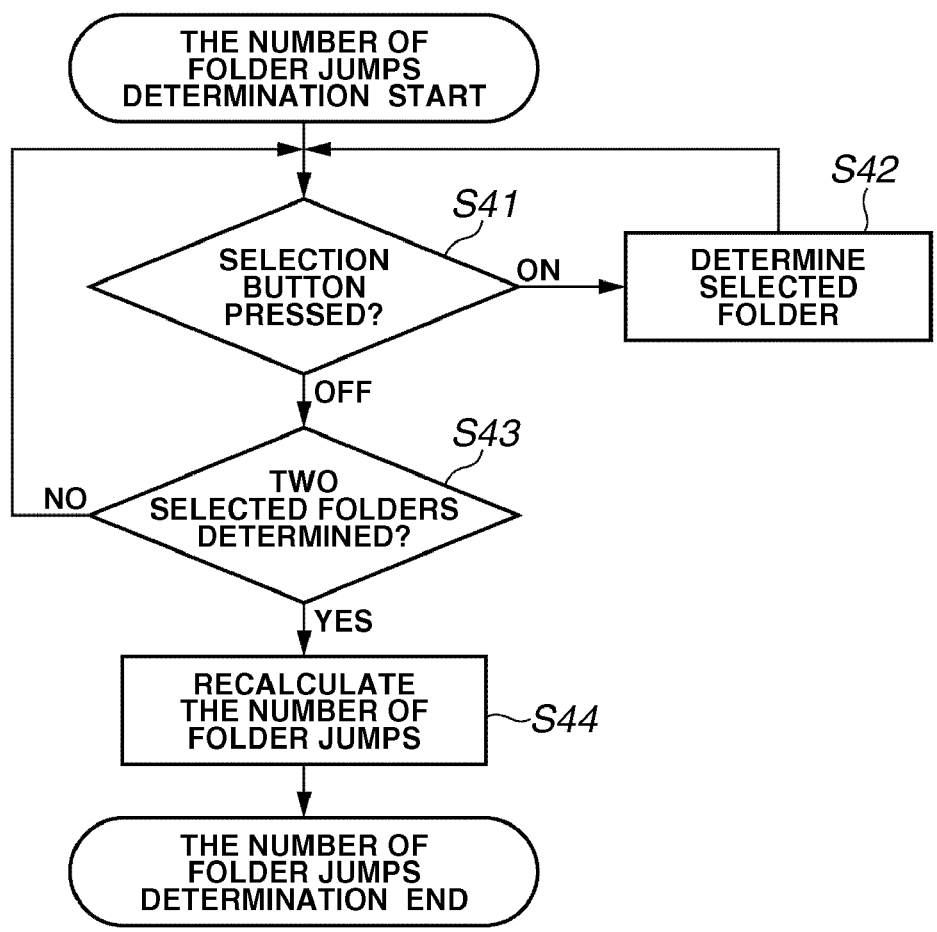
FIG. 20 is a flow chart showing processing for determining the number of folder jumps, according to an aspect of the present invention.

A CPU 109a not only realizes operations of the first exemplary embodiment described above, but may also carry out the exemplary operations shown in FIG. 20 according to an operation on the folder selection button 200 and the selected folder determination button 201.

FIG. 20 is a flow chart showing exemplary number of folder jumps determination processing in which a folder selection operation is applied to the digital camera 100a according to the second exemplary embodiment shown in FIG. 18. The CPU 109a first determines whether the folder selection button 200 is on or off (S41). If, as a result, the folder selection button 200 is found to be on, the CPU 109a selects one folder from folders recorded on the memory card 121 and determines the folder depending on an operation on the selected folder determination button 201 (S42). The CPU 109a stores the determined folder as one of two selection folders SFA and SFB to be selected in RAM memory 113 or the like.

By repeating the folder selection/determination operation described above twice or more, the selection folders SFA and SFB for determining the number of folder jumps can be determined. If the folder selection/determination operation is repeated three times or more, the selection folders determined by the two immediately preceding operations are adopted. If the two selection folders SFA and SFB determined in steps S41 and S42 are not acceptable (No in step S43), the processing in steps S41 and S42 is repeated.

If the two selection folders SFA and SFB determined in steps S41 and S42 are acceptable (Yes in step S43), the CPU 109a counts the number of folders between the two selection folders SFA and SFB (S44). The CPU 109a further determines a quotient obtained by dividing the total number of folders, defined as the number of folders between the two selection folders SFA and SFB obtained by counting them, by the constant T recorded on the non-volatile memory 111 as the number of folder jumps (S44). Then, the number of folder jumps determination processing is terminated.

Here, as a method for selecting the selection folders SFA and SFB, a list of folders for selecting the selection folders may be provided in a screen dedicated to folder selection or folder selection may be realized by selecting an image, whereby a folder in which the image exists is selected.

Using the number of folder jumps determined as described above, the CPU 109a performs the folder jump reproduction operation described for the first exemplary embodiment on images of all folders. If a range of target is all folders as described above, the two selection folders SFA and SFB will be used only for simply determining the number of folder jumps.

The CPU 109a may also perform the folder jump reproduction operation described for the first exemplary embodiment on images in folders between the two selection folders SFA and SFB. If the range of target is images between the two selection folders SFA and SFB as described above, the two selection folders SFA and SFB will be used not only for determining the number of folder jumps, but also for specifying the range of target.

According to the second exemplary embodiment described above, as in the first exemplary embodiment, when searching for a desired folder or image file from the memory card 121 in which many image files are classified and recorded in a plurality of folders, searching can be done with simple operations and operability related to searching can be improved. Also, for example, by determining the two selection folders SFA and SFB in the folder jump reproduction described for the first exemplary embodiment and determining the number of folder jumps based on the number of folders between the determined two selection folders SFA and SFB, image searching and viewing can be done while gradually narrowing down the range. This makes it easier to find a desired folder or image file even if the number of folders increases. An effect thereof becomes more pronounced as the number of target folders increases and can greatly improve user convenience.

Other Exemplary Embodiments

Each exemplary embodiment described above can also be realized by a computer program executable on a computer (or a CPU, MPU and the like) in an apparatus or system. In such a case, the computer program is supplied to the apparatus or system via a computer readable recording medium. The computer readable recording medium may be, for example, a flexible disk, hard disk, optical disk, magneto-optical disk, CD-ROM, magnetic tape, non-volatile memory card, or ROM.

If the functions of the exemplary embodiments described above are realized not only by execution of a supplied computer program by a computer, but also by cooperation of the computer program with an OS (operating system), other application software or the like operating on the computer, the computer program is included in the exemplary embodiments of the present invention.

Furthermore, if, after a supplied computer program is stored in memory provided in an expansion board of a computer or an expansion unit connected to the computer, CPU or the like provided in the expansion board or expansion unit performs part or all of processing based on instructions of the computer program, and the functions of the exemplary embodiments described above are realized by the processing, the computer program is included in the exemplary embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-235091 filed Aug. 12, 2005, which is hereby incorporated by reference herein in its entirety.

What is claimed:

1. An image display apparatus, comprising:
a display unit configured to display an image from an image file in a currently selected folder;
a non-volatile memory that stores a folder jump number;
a user interface unit configured to change the folder jump number;
a control unit configured to determine a jump folder based on the changed folder jump number and display a top image of the jump folder on the display unit; and
a processing unit configured to generate a top image of a next jump folder by multiplying a rate with a total number of image files in the next jump folder, wherein the rate is calculated by dividing a position of a currently displayed image file in a currently selected jump folder by a total number of image files in the currently selected jump folder.

2. The image display apparatus according to claim 1, wherein the image display apparatus is one of a digital camera and a digital video camera.

3. The image display apparatus according to claim 1, wherein the currently selected folder and the jump folder are in a recording medium, the recoding medium being removable from the image display apparatus.

4. A method for controlling an image display apparatus including a display unit and a non-volatile memory, the method comprising:
displaying an image from an image file in a currently selected folder on the display unit;
changing a folder jump number stored in the non-volatile memory, the folder jump number being changed via a user interface unit of the image display apparatus;
determining a jump folder based on the changed folder jump number, wherein the jump folder is a folder two or more folders ahead or behind from the currently selected folder;
displaying a top image of the jump folder on the display unit; and
generating a top image of a next jump folder by multiplying a rate with a total number of image files in the next jump folder, wherein the rate is calculated by dividing a position of a currently displayed image file in a currently selected jump folder by a total number of image files in the currently selected jump folder.

5. The method according to claim 4, wherein the image display apparatus is one of a digital camera and a digital video camera.

6. The method according to claim 4, wherein the currently selected folder and the jump folder are in a recording medium, the recording medium being removable from the image display apparatus.

7. A non-transitory computer readable recording medium containing a program for controlling an image display apparatus including a display unit and a non-volatile memory, the program comprising:
computer-executable instructions for displaying an image from an image file in a currently selected folder on the display unit;
computer-executable instructions for changing a folder jump number stored in the non-volatile memory, the folder jump number being changed via a user interface unit of the image display apparatus;
computer-executable instructions for determining a jump folder based on the changed folder jump number, wherein the jump folder is a folder two or more folders ahead or behind from the currently selected folder;
computer-executable instructions for displaying a top image of the jump folder on the display unit;
and computer-executable instructions for generating a top image of a next jump folder by multiplying a rate with a total number of image files in the next jump folder, wherein the rate is calculated by dividing a position of a currently displayed image file in a currently selected jump folder by a total number of image files in the currently selected jump folder.

8. The computer readable recording medium according to claim 7, wherein the image display apparatus is one of a digital camera and a digital video camera.

9. The computer readable recording medium according to claim 7, wherein the currently selected folder and the jump folder are in a recording medium, the recording medium being removable from the image display apparatus.

* * * * *